United States Patent
Ohishi et al.

(10) Patent No.: US 6,681,076 B1
(45) Date of Patent: Jan. 20, 2004

(54) MAGNETIC RECORDING AND REPRODUCING APPARATUS FOR AUTOMATICALLY SETTING THE TRAVELING SPEED OF THE RECORDING MEDIUM IN ACCORDANCE WITH THE TRANSMISSION RATE OF THE INPUT DIGITAL SIGNAL

(75) Inventors: Takeo Ohishi, Yokohama (JP); Mitsuo Fujita, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/551,724

(22) Filed: Apr. 18, 2000

Related U.S. Application Data

(62) Division of application No. 09/246,099, filed on Feb. 8, 1999, now Pat. No. 6,097,876, which is a continuation of application No. 08/539,641, filed on Oct. 5, 1995, now abandoned.

(30) Foreign Application Priority Data

| Oct. 7, 1994 | (JP) | 6-270691 |
| Oct. 7, 1994 | (JP) | 6-270693 |
| Oct. 7, 1994 | (JP) | 6-270694 |

(51) Int. Cl.⁷ .............................. H04N 5/91
(52) U.S. Cl. ................. 386/68; 386/80; 386/81
(58) Field of Search ............... 386/68, 67, 46, 386/6, 7, 124, 129, 96, 104, 40, 71, 72, 109, 111, 112, 81, 80; H04N 5/91

(56) References Cited

U.S. PATENT DOCUMENTS

| 4,338,631 A | 7/1982 | Ota |
| 4,800,447 A | 1/1989 | Toba |
| 4,942,487 A | 7/1990 | Noguchi et al. |
| 5,065,259 A | 11/1991 | Kubota et al. |
| 5,083,225 A | 1/1992 | Morisaki et al. |
| 5,377,051 A | * 12/1994 | Lane et al. .................... 386/81 |
| 5,450,209 A | * 9/1995 | Niimura et al. ............... 386/68 |
| 5,477,396 A | * 12/1995 | Fukami et al. ............ 360/10.3 |
| 5,477,399 A | * 12/1995 | Honjo et al. ............. 360/73.07 |

FOREIGN PATENT DOCUMENTS

| DE | 3722577 | 1/1988 |
| DE | 3737054 | 5/1988 |
| DE | 3808198 | 9/1988 |
| EP | 0563841 | 10/1993 |
| EP | 0618567 | 10/1994 |
| JP | 59195306 | 11/1984 |
| JP | 61139906 | 6/1986 |
| JP | 6044505 | 2/1994 |
| JP | 6-044505 | 2/1994 |

* cited by examiner

*Primary Examiner*—Robert Chevalier
(74) *Attorney, Agent, or Firm*—Israel Gopstein Clark & Brody

(57) ABSTRACT

A first rotational head of a first azimuth angle and a second rotational head of a second azimuth angle are arranged on a rotational drum rotated at a constant rotational speed. Also, input digital signals are processed in a signal recording system to form blocks of digital recording signals, a magnetic tape is moved by a tape driving unit according to an information signal generated in a control unit, and the blocks of digital recording signals and the information signal are recorded on the magnetic tape in a recording operation through the first and second heads alternately tracing the magnetic tape. In a reproducing operation, the signals are read through the first and second heads and are reproduced in a signal reproducing system. When the input digital signals are transmitted at a standard data rate, the magnetic tape is rotated at a first traveling speed in the recording and reproducing operations. When the input digital signals are transmitted at a second data rate equal to 1/N (N is a natural number) the standard data rate, the magnetic tape is rotated at a second traveling speed equal to 1/N the first traveling speed in the recording and reproducing operations. Therefore, the input digital signals can be recorded and reproduced regardless of the data rate of the signals.

10 Claims, 19 Drawing Sheets

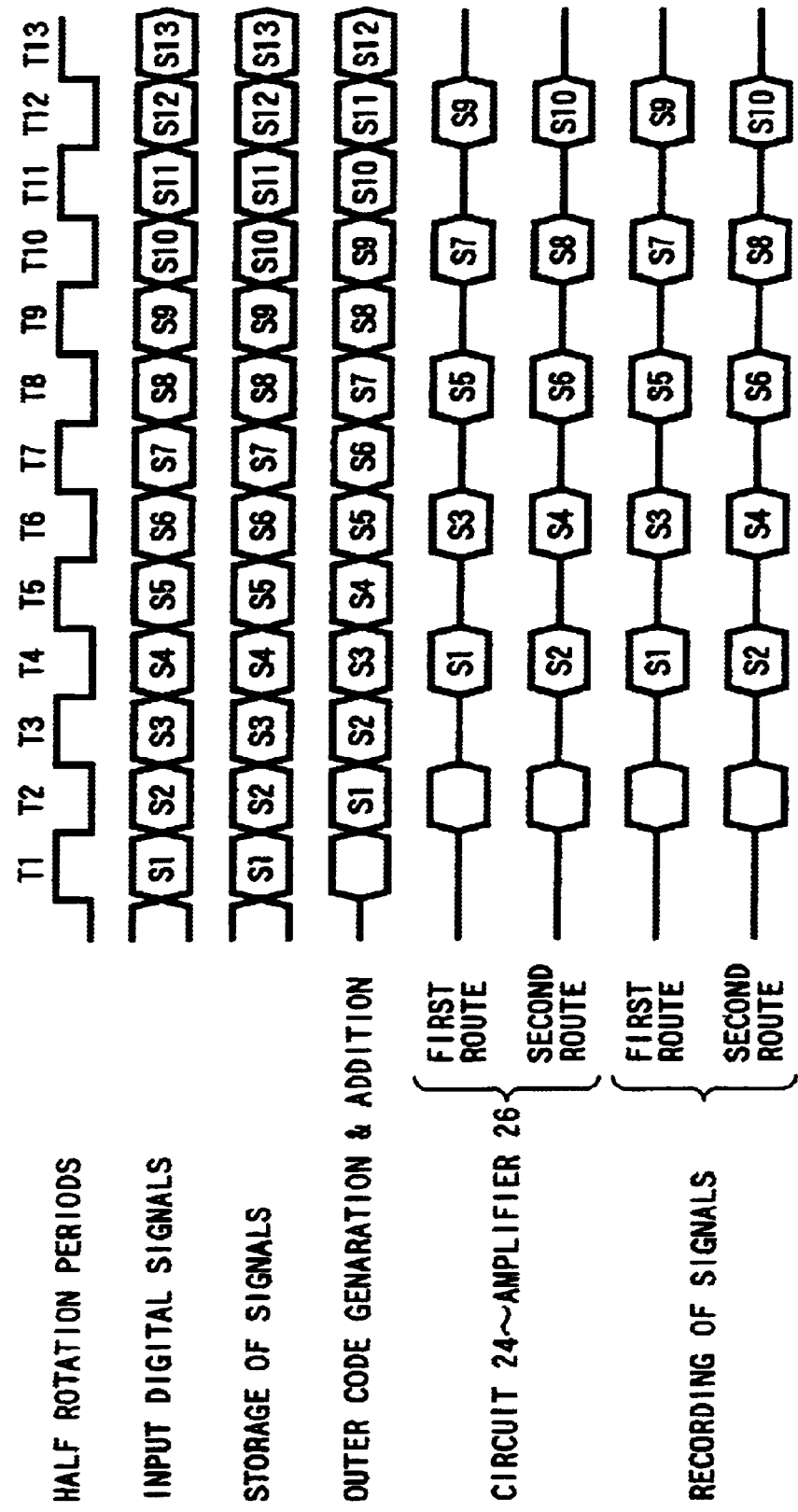

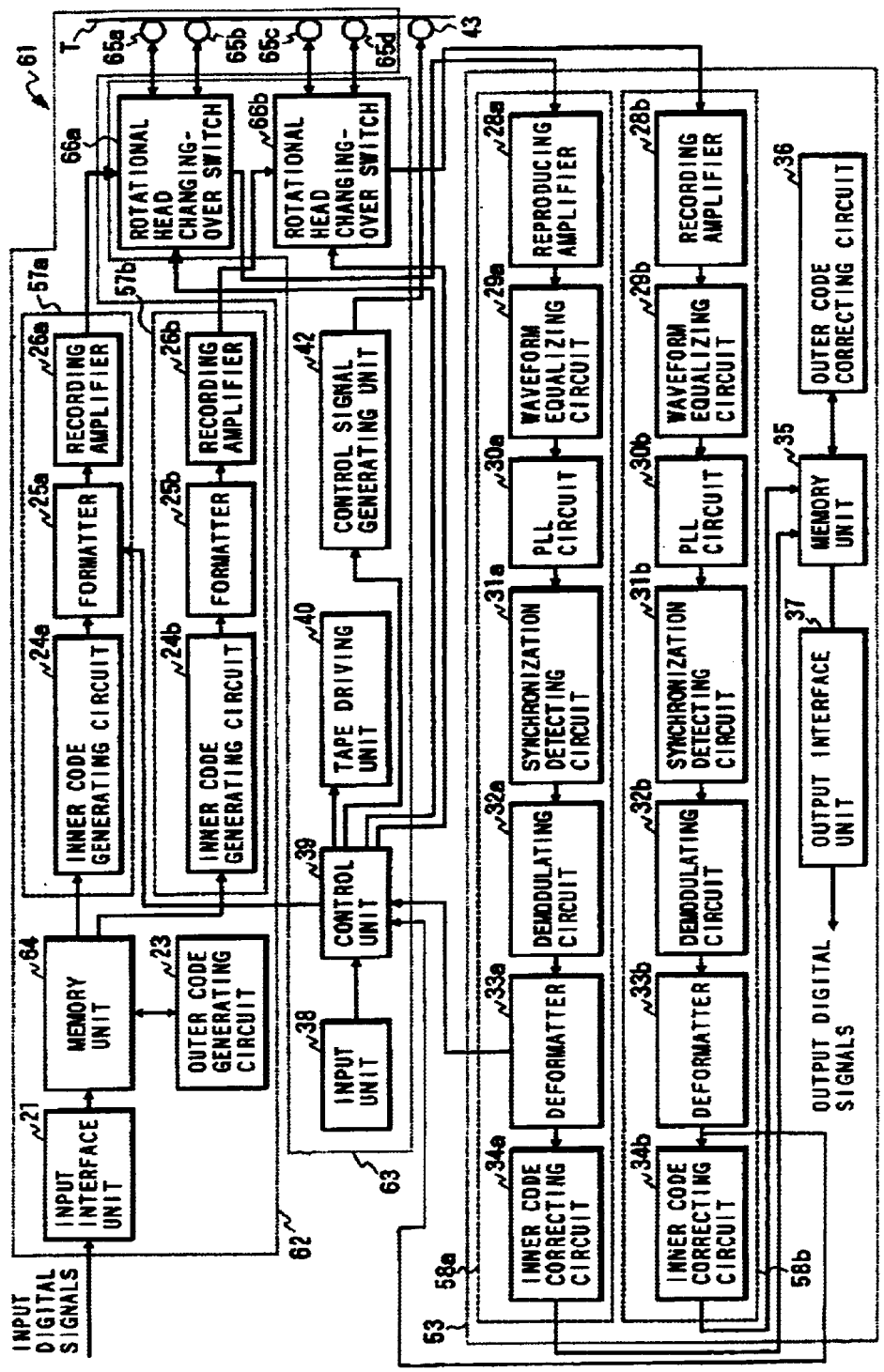

MAGNETIC RECORDING AND REPRODUCING APPARATUS FOR AUTOMATICALLY SETTING THE TRAVELING SPEED OF THE RECORDING MEDIUM IN ACCORDANCE WITH THE TRANSMISSION RATE OF THE INPUT DIGITAL SIGNAL

This application is a Divisional of application Ser. No. 09/246,099, filed Feb. 8, 1999, which is a Continuation of Ser. No. 08/539,641 filed Oct. 5, 1995, now abandoned.

BACKGROUND OF THE INVENTION

1. Field of the Invention

The present invention relates generally to a magnetic recording and reproducing apparatus in which digitized picture signals and digitized information signals are recorded on a magnetic tape through a rotational head while forming a series of inclined video tracks on the magnetic tape and are reproduced from the tracks of the magnetic tape, and more particularly to a magnetic recording and reproducing apparatus in which any of groups of digitized signals transmitted at different data rates is recorded and reproduced.

2. Description of the Related Art

As a magnetic recording and reproducing apparatus in which digitized signals are recorded and reproduced in/from a magnetic recording medium such as a magnetic tape through a rotational head, a video tape recorder, a digital tape recorder or the like are conventionally known. In the above conventional apparatus, picture signals and audio signals converted into digital signals are recorded at a high recording density and are reproduced.

However, digital signals are recorded and reproduced at a fixed recording data rate in the conventional magnetic recording and reproducing apparatus. Therefore, in cases where digital signals transmitted at a data rate lower than the fixed recording data rate are recorded in the conventional apparatus, a remaining data region between data regions for the digital signals is filled with zero data "0" to change the digital signals to processed digital signals having the fixed recording data rate, and the processed digital signals are recorded and reproduced at the fixed recording data rate in the conventional apparatus. Therefore, even though the digital signals transmitted at the data rate lower than the fixed recording data rate are input to the conventional apparatus, an allowable recording time in the conventional apparatus for digital signals transmitted at a data rate lower than the fixed recording data rate cannot be lengthened. In other words, there is a drawback that a recording capacity for the digital signals transmitted at the data rate lower than the fixed recording data rate is lower than that for the digital signals transmitted at the fixed recording data rate.

2.1. Previously Proposed Art:

To solve the above drawback, For example, the digital signals are modulated to PCM signals according to a pulse code modulation (PCM), and the PCM signals are recorded and reproduced through a rotational head in a PCM signal recording and reproducing apparatus (the Published Unexamined Japanese Patent Application No.S59-195306 (195306/1984)). Also, an audio digital tape recorder operated with a rotational head is proposed (the Published Unexamined Japanese Patent Application No.S61-139906 (139906/1986)).

In the Application No.S61-139906, the audio digital tape recorder has a rotational cylinder on which a magnetic tape is wound, a pair of rotational heads which are attached to the rotational cylinder and have different azimuth angles, and a tape driving means for driving the magnetic tape at a prescribed speed. In the above configuration, the magnetic tape travels at a first tape traveling speed by the function of the tape driving means in cases where digital signals transmitted at a standard data rate are input. Also, the magnetic tape travels at a second tape traveling speed equal to ⅓ the first tape traveling speed by the function of the tape driving means in cases where digital signals transmitted at a low data rate equal to ⅓ the standard data rate are input, and the digital signals are recorded or reproduced each time one of the rotational heads traces the magnetic tape three times. Therefore, regardless of whether digital signals transmitted at the standard data rate or at the low data rate are input to the audio digital tape recorder, the digital signals can be recorded and reproduced at the same data rate.

2.2. Problems to be Solved by the Invention:

However, the data rate in the above audio digital tape recorder is limited to the standard data rate and the low data rate (⅓ standard data rate) because of the relationship between the different azimuth angles in a recording operation, and a digital data recording and reproducing apparatus in which picture signals, audio signals and other information signals in a moving picture experts group 1 (MPEG1), a moving picture experts group 2 (MPEG2), a digital video broadcasting (DVD), an advanced television (ATV) and the like are converted into digital signals transmitted at various data rates and the digital signals are efficiently recorded and reproduced has been recently required. Therefore, digital signals cannot be efficiently recorded or reproduced in cases where the digital signals transmitted at one of other data rates are input, and there is a drawback that a utilization efficiency of a recording medium for digital signals cannot be enhanced.

That is, in cases where a recording and reproducing technique in the above audio digital tape recorder is simply extended to be applied for digital signals transmitted at an arbitrary data rate equal to $1/(2N)$ (N is an integer) the standard data rate, a pair of video tracks adjacent to each other on the magnetic tape have the same azimuth, and there is a drawback that a guard bandless azimuth recording cannot be performed in the above audio digital tape recorder.

Also, in cases where the rotational speed of the rotational cylinder is changed to read out digital signals recorded at a fixed data rate, even though the digital signals are recorded on the magnetic tape in equal magnetic inversion intervals, the inversion frequency of the digital signals reproduced changes according to the rotational speed of the rotational cylinder. Therefore, it is required to prepare a waveform equalization circuit for each rotational speed of the rotational cylinder, and there is a drawback that the configuration of the above audio digital tape recorder is complicated.

Also, in the PCM signal recording and reproducing apparatus disclosed in the Application No.S59-195306, the PCM signals time-compressed are recorded and reproduced in an attaching period in which the rotational head is attached to the magnetic tape. In this case, it is required to stop the driving of the magnetic tape three times in the attaching period each time the rotational head is rotated at a prescribed rotational speed, and it is required to move the magnetic tape at a high speed during the traveling of the magnetic tape. Therefore, there is a drawback that the control of the magnetic tape is complicated.

SUMMARY OF THE INVENTION

A first object of the present invention is to provide, with due consideration to the drawbacks of such a conventional magnetic recording and reproducing apparatus, a magnetic recording and reproducing apparatus in which digital signals are efficiently recorded in a magnetic recording medium regardless of a data rate of the digital signals and digital signals recorded at any of various data rates are reproduced without complicating the configuration of a reproducing circuit.

A second object of the present invention is to provide a magnetic recording and reproducing apparatus in which digital signals transmitted at a first data rate or at an arbitrary data rate equal to 1/N the first data rate are recorded and reproduced without changing the rotational speed of a rotational cylinder in a reproducing operation according to the data rate of the recorded digital signals and without using any additional rotational head.

The first object is achieved by the provision of a magnetic recording and reproducing apparatus for recording and reproducing digital signals on/from a magnetic recording medium, comprising:

signal processing means for processing a plurality of input digital signals transmitted at a first data rate, a second data rate equal to 1/N (N is a natural number) the first data rate or a third data rate equal to N times the first data rate and producing a plurality of blocks of digital recording signals; control means for generating an information signal which indicates a first traveling speed of a magnetic recording medium in cases where the input digital signals transmitted at the first data rate are processed in the signal processing means, a second traveling speed equal to 1/N the first traveling speed in cases where the input digital signals transmitted at the second data rate are processed in the signal processing means or a third traveling speed equal to N times the first traveling speed in cases where the input digital signals transmitted at the third data rate are processed in the signal processing means;

driving means for driving the magnetic recording medium at the first, second or third traveling speed according to the information signal generated in the control means;

recording and reading means, having a first azimuth head of a first azimuth angle and a second azimuth head of a second azimuth angle, for recording the blocks of digital recording signals processed in the signal processing means and the information signal generated in the control means on the magnetic recording medium driven by the driving means to form alternate rows of first blocks of digital recording signals recorded through the first azimuth head and second blocks of digital recording signals recorded through the second azimuth head on the magnetic recording medium and reading the blocks of digital recording signals and the information signal recorded on the magnetic recording medium on condition that the first blocks of digital recording signals are read through the first azimuth head and the second blocks of digital recording signals are read through the second azimuth head; head tracing means for repeatedly making the first and second azimuth heads of the recording and reading means trace the magnetic recording medium at a fixed cycle, the first blocks of digital recording signals being recorded or read through the first azimuth head each time the first azimuth head traces the magnetic recording medium at the fixed cycle, and the second blocks of digital recording signals being recorded or read through the second azimuth head each time the second azimuth head traces the magnetic recording medium at the fixed cycle; and signal reproducing means for reproducing the information signal read through the recording and reading means, transferring the information signal to the driving means to drive the magnetic recording medium at the same traveling speed as that at which the magnetic recording medium is driven to record the digital recording signals, and reproducing the blocks of digital recording signals read through the first and second azimuth heads.

In the above configuration, in cases where the input digital signals transmitted at the first data rate are processed in the signal processing means in a recording operation, an information signal indicating a first traveling speed of a magnetic recording medium is generated in the control means, and the magnetic recording medium is driven at the first traveling speed by the driving means according to the information signal.

In cases where the input digital signals transmitted at the second data rate are processed in the signal processing means in a recording operation, an information signal indicating a second traveling speed is generated in the control means, and the magnetic recording medium is driven at the second traveling speed by the driving means according to the information signal. In this case, a ratio of the first data rate to the second data rate is equal to another ratio of the first traveling speed to the second traveling speed.

In cases where the input digital signals transmitted at the third data rate are processed in the signal processing means in a recording operation, an information signal indicating a third traveling speed is generated in the control means, and the magnetic recording medium is driven at the third traveling speed by the driving means according to the information signal. In this case, a ratio of the first data rate to the third data rate is equal to another ratio of the first traveling speed to the third traveling speed.

Thereafter, the digital recording signals are recorded on the magnetic recording medium with the information signal while the first and second azimuth heads of the recording and reading means repeatedly tracing the magnetic recording medium at a fixed cycle. In this case, alternate rows of first blocks of digital recording signals recorded through the first azimuth head and second blocks of digital recording signals recorded through the second azimuth head are formed on the magnetic recording medium.

Accordingly, the input digital signals can be efficiently and reliably recorded on the magnetic regardless of the data rate of the input digital signals.

Also, because the traveling speed of the magnetic recording medium is controlled in proportion to the data rate of the input digital signals and the first and second azimuth heads trace the magnetic recording medium at the fixed cycle regardless of the data rate of the input digital signals, the digital recording signals can be recorded on the magnetic recording medium at a constant data recording density regardless of the data rate of the input digital signals. Therefore, a data recording time of the magnetic recording medium can be prolonged N times for the input digital signals transmitted at the second data rate as compared with that for the input digital signals transmitted at the first data rate.

Thereafter, in a reproducing operation, the information signal recorded on the magnetic recording medium is read out from the magnetic recording medium to the signal reproducing means through the recording and reading means and is transferred to the driving means. Therefore, the magnetic recording medium is driven at the same traveling speed as that at which the magnetic recording medium is driven to record the digital recording signals. Thereafter, the blocks of digital recording signals recorded are read out from the magnetic recording medium through the first and second azimuth heads of the recording and reading means which trace the magnetic recording medium at the fixed cycle. In this case, the first blocks of digital recording signals are read out through the first azimuth head, and the second blocks of digital recording signals are read out through the second azimuth head. Thereafter, the blocks of digital recording signals are reproduced in the signal reproducing means.

Accordingly, because the tracing cycle of the first and second azimuth heads in the reproducing operation is the same as that in the recording operation and the magnetic recording medium is driven in the reproducing operation at the same traveling speed as that in the recording operation, digital reproducing signals which are the same as the digital recording signals can be obtained in the signal reproducing means. In other words, reproducibility of the input digital signals is superior in the magnetic recording and reproducing apparatus.

Also, because the tracing cycle of the first and second azimuth heads is fixed regardless of the recording or reproducing operation and regardless of the data rate of the input digital signals and the magnetic recording medium is driven in the reproducing operation at the same traveling speed as that in the recording operation, the configuration of the magnetic recording and reproducing apparatus can be simplified.

The first object is also achieved by the provision of a magnetic recording and reproducing apparatus for recording and reproducing digital signals on/from a magnetic recording medium, comprising:

signal processing means for processing a plurality of input digital signals transmitted at a first data rate, a second data rate equal to $1/(2*N)$ (N is a natural number) the first data rate or a third data rate equal to $1/(2*N+1)$ the first data rate and producing a plurality of blocks of digital recording signals;

control means for generating an information signal which indicates a first traveling speed of a magnetic recording medium in cases where the input digital signals transmitted at the first data rate are processed in the signal processing means, a second traveling speed equal to $1/(2*N)$ the first traveling speed in cases where the input digital signals transmitted at the second data rate are processed in the signal processing means or a third traveling speed equal to $1/(2*N+1)$ the first traveling speed in cases where the input digital signals transmitted at the third data rate are processed in the signal processing means;

driving means for driving the magnetic recording medium at the first, second or third traveling speed according to the information signal generated in the control means;

recording and reading means, having a first azimuth head of a first azimuth angle and a second azimuth head of a second azimuth angle, for recording the blocks of digital recording signals processed in the signal processing means and the information signal generated in the control means on the magnetic recording medium driven by the driving means to form alternate rows of first blocks of digital recording signals recorded through the first azimuth head and second blocks of digital recording signals recorded through the second azimuth head on the magnetic recording medium and reading the blocks of digital recording signals and the information signal recorded on the magnetic recording medium on condition that the first blocks of digital recording signals are read through the first azimuth head and the second blocks of digital recording signals are read through the second azimuth head;

a rotational drum, on which the first and second azimuth heads of the recording and reading means are attached, for circulating the first and second azimuth heads at a fixed rotational speed to repeatedly make the first and second azimuth heads trace the magnetic recording medium at a fixed cycle, the first blocks of digital recording signals being recorded or read through the first azimuth head each time the first azimuth head traces the magnetic recording medium at the fixed cycle, and the second blocks of digital recording signals being recorded or read through the second azimuth head each time the second azimuth head traces the magnetic recording medium at the fixed cycle; and signal reproducing means for reproducing the information signal read through the recording and reading means, transferring the information signal to the driving means to drive the magnetic recording medium at the same traveling speed as that at which the magnetic recording medium is driven to record the digital recording signals, and reproducing the blocks of digital recording signals read through the first and second azimuth heads.

In the above configuration, the magnetic recording medium is driven at the first traveling speed by the driving means under the control of the control means in cases where the input digital signals transmitted at the first data rate are processed in the signal processing means, the magnetic recording medium is driven at $1/(2N)$ the first traveling speed by the driving means under the control of the control means in cases where the input digital signals transmitted at $1/(2N)$ the first data rate are processed in the signal processing means, and the magnetic recording medium is driven at $1/(2N+1)$ the first traveling speed by the driving means under the control of the control means in cases where the input digital signals transmitted at $1/(2N+1)$ the first data rate are processed in the signal processing means. Therefore, regardless of the data rate of the input digital signals, the digital recording signals can be reliably recorded on the magnetic recording medium at a constant data recording density.

Also, when the digital recording signals recorded in the magnetic recording medium are reproduced, the magnetic recording medium is driven by the driving means at the same traveling speed as that at which the magnetic recording medium is driven to record the digital recording signals. Therefore, regardless of the data rate of the input digital signals, the digital recording signals recorded in the magnetic recording medium can be reliably reproduced at a high reproducibility, and the configuration of the magnetic recording and reproducing apparatus can be simplified.

The first object is also achieved by the provision of a magnetic recording and reproducing apparatus for recording and reproducing digital signals on/from a magnetic recording medium, comprising:

signal processing means for processing a plurality of input digital signals transmitted at a first data rate or a second data rate equal to $1/N$ (N is a natural number) the first data rate and producing a plurality of blocks of digital recording signals;

control means for generating an information signal which indicates a first traveling speed of a magnetic recording medium in cases where the input digital signals transmitted at the first data rate are processed in the signal processing means or a second traveling speed equal to 1/N the first traveling speed in cases where the input digital signals transmitted at the second data rate are processed in the signal processing means;

driving means for driving the magnetic recording medium at the first or second traveling speed according to the information signal generated in the control means;

recording and reading means, having a first head of a first azimuth angle and a second head of a second azimuth angle, for recording the blocks of digital recording signals processed in the signal processing means and the information signal generated in the control means on the magnetic recording medium driven by the driving means to form alternate rows of first blocks of digital recording signals recorded through the first head and second blocks of digital recording signals recorded through the second head on the magnetic recording medium and reading the blocks of digital recording signals and the information signal recorded on the magnetic recording medium on condition that the first blocks of digital recording signals are read through the first head and the second blocks of digital recording signals are read through the second head;

a rotational drum, on which the first and second heads of the recording and reading means are attached, for circulating the first and second heads at a fixed rotational speed to repeatedly make the first and second heads trace the magnetic recording medium at a fixed cycle, the first blocks of digital recording signals being recorded or read through the first head each time the first head traces the magnetic recording medium at the fixed cycle, and the second blocks of digital recording signals being recorded or read through the second head each time the second head traces the magnetic recording medium at the fixed cycle; and signal reproducing means for reproducing the information signal read through the recording and reading means, transferring the information signal to the driving means to drive the magnetic recording medium at the same traveling speed as that at which the magnetic recording medium is driven to record the digital recording signals, and reproducing the blocks of digital recording signals read through the first and second heads.

In the above configuration, the magnetic recording medium is driven at the first traveling speed by the driving means under the control of the control means in cases where the input digital signals transmitted at the first data rate are processed in the signal processing means, and the magnetic recording medium is driven at 1/N the first traveling speed by the driving means under the control of the control means in cases where the input digital signals transmitted at 1/N the first data rate are processed in the signal processing means. Therefore, regardless of the data rate of the input digital signals, the digital recording signals can be reliably recorded on the magnetic recording medium at a constant data recording density.

Also, when the digital recording signals recorded in the magnetic recording medium are reproduced, the magnetic recording medium is driven by the driving means at the same traveling speed as that at which the magnetic recording medium is driven to record the digital recording signals. Therefore, regardless of the data rate of the input digital signals, the digital recording signals recorded in the magnetic recording medium can be reliably reproduced at a high reproducibility, and the configuration of the magnetic recording and reproducing apparatus can be simplified.

The first object is also achieved by the provision of a magnetic recording and reproducing apparatus for recording and reproducing digital signals on/from a magnetic recording medium, comprising:

signal processing means for processing a plurality of input digital signals transmitted at a first data rate or a second data rate equal to N times (N is a natural number) the first data rate and producing a plurality of blocks of digital recording signals;

control means for generating an information signal which indicates a first traveling speed of a magnetic recording medium in cases where the input digital signals transmitted at the first data rate are processed in the signal processing means or a second traveling speed equal to N times the first traveling speed in cases where the input digital signals transmitted at the second data rate are processed in the signal processing means;

driving means for driving the magnetic recording medium at the first or second traveling speed according to the information signal generated in the control means;

recording and reading means, having a first azimuth head of a first azimuth angle and a second azimuth head of a second azimuth angle, for recording the blocks of digital recording signals processed in the signal processing means and the information signal generated in the control means on the magnetic recording medium driven by the driving means to form alternate rows of first blocks of digital recording signals recorded through the first azimuth head and second blocks of digital recording signals recorded through the second azimuth head on the magnetic recording medium and reading the blocks of digital recording signals and the information signal recorded on the magnetic recording medium on condition that the first blocks of digital recording signals are read through the first azimuth head and the second blocks of digital recording signals are read through the second azimuth head;

a rotational drum, on which the first and second azimuth heads of the recording and reading means are attached, for circulating the first and second azimuth heads at a fixed rotational speed to repeatedly make the first and second azimuth heads trace the magnetic recording medium at a fixed cycle, the first blocks of digital recording signals being recorded or read through the first azimuth head each time the first azimuth head traces the magnetic recording medium at the fixed cycle, and the second blocks of digital recording signals being recorded or read through the second azimuth head each time the second azimuth head traces the magnetic recording medium at the fixed cycle; and signal reproducing means for reproducing the information signal read through the recording and reading means, transferring the information signal to the driving means to drive the magnetic recording medium at the same traveling speed as that at which the magnetic recording medium is driven to record the digital recording signals, and reproducing the blocks of digital recording signals read through the first and second azimuth heads.

In the above configuration, the magnetic recording medium is driven at the first traveling speed by the driving means under the control of the control means in cases where the input digital signals transmitted at the first data rate are processed in the signal processing means, and the magnetic recording medium is driven at N times the first traveling speed by the driving means under the control of the control means in cases where the input digital signals transmitted at N times the first data rate are processed in the signal processing means. Therefore, regardless of the data rate of the input digital signals, the digital recording signals can be reliably recorded on the magnetic recording medium at a constant data recording density.

Also, when the digital recording signals recorded in the magnetic recording medium are reproduced, the magnetic recording medium is driven by the driving means at the same traveling speed as that at which the magnetic recording medium is driven to record the digital recording signals. Therefore, regardless of the data rate of the input digital signals, the digital recording signals recorded in the magnetic recording medium can be reliably reproduced at a high reproducibility, and the configuration of the magnetic recording and reproducing apparatus can be simplified.

The second object is achieved by the provision of a magnetic recording and reproducing apparatus for recording and reproducing digital signals on/from a magnetic recording medium, comprising:

signal processing means for processing a plurality of input digital signals transmitted at a first data rate or a second data rate equal to 1/N (N is a natural number) the first data rate and producing a plurality of blocks of digital recording signals, a piece of data rate information which indicates a data rate of the input digital signals being included in the input digital signals;

data rate detecting means for detecting the data rate information included in the input digital signals; driving means for driving the magnetic recording medium in a traveling direction;

rotating means for rotating a rotational cylinder in a rotational direction inclined with respect to the traveling direction of the magnetic recording medium driven by the driving means;

a first head of a first azimuth angle and a second head of a second azimuth angle arranged on the rotational cylinder on condition that the first head is placed at 180 degrees apart from the second head, for alternately tracing the magnetic recording medium driven by the driving means by rotating the rotational cylinder by use of the rotating means, recording the blocks of digital recording signals and the data rate information processed in the signal processing means on the magnetic recording medium while alternately forming first azimuth tracks generated by recording first blocks of digital recording signals through the first head and second azimuth tracks generated by recording second blocks of digital recording signals through the second head on the magnetic recording medium in a track recording direction and reading the blocks of digital recording signals and the data rate information from the magnetic recording medium driven by the driving means in a track reading direction by rotating the rotational cylinder by use of the rotating means on condition that the first blocks of digital recording signals are read through the first head and the second blocks of digital recording signals are read through the second head;

signal reproducing means for reproducing the data rate information and the blocks of digital recording signals read from the magnetic recording medium through the first and second heads;

tape traveling speed control means for controlling the driving means to drive the magnetic recording medium at a first traveling speed in cases where the data rate information detected in the data rate detecting means indicates the first data rate and to drive the magnetic recording medium at a second traveling speed equal to 1/N the first traveling speed in cases where the data rate information detected in the data rate detecting means indicates the second data rate and controlling the driving means to drive the magnetic recording medium at the first traveling speed in cases where the data rate information reproduced in the signal reproducing means indicates the first data rate and to drive the magnetic recording medium at the second traveling speed in cases where the data rate information reproduced in the signal reproducing means indicates the second data rate; and rotational cylinder control means for controlling the rotating means to rotate the rotational cylinder at a first rotational speed in cases where the data rate information detected in the data rate detecting means indicates the first data rate and to rotate the rotational cylinder at a second rotational speed equal to 1/N the first rotational speed in cases where the data rate information detected in the data rate detecting means indicates the second data rate and controlling the rotating means to rotate the rotational cylinder at the first rotational speed in cases where the blocks of digital recording signals recorded on the magnetic recording medium are read through the first and second heads.

In the above configuration, in cases where a plurality of input digital signals transmitted at a first data rate is processed in the signal processing means to generate a plurality of blocks of digital recording signals, a piece of data rate information included in the signals is detected in the data rate detecting means, and the data rate detecting means informs the tape traveling speed control means and the rotational cylinder control means of the first data rate. Thereafter, a magnetic recording medium is driven at a first traveling speed in a traveling direction by the driving means under control of the tape traveling speed control means, and a rotational cylinder is rotated at a first rotational speed by the rotating means under control of the rotational cylinder control means. Therefore, the first and second heads arranged opposite to each other on the rotational cylinder alternately trace the magnetic recording medium, and the blocks of digital recording signals including the data rate information processed in the signal processing means are recorded on the magnetic recording medium. In this case, each block of digital recording signals is, for example, provided to the first or second head for each half rotation of the rotational cylinder and is recorded. Also, first azimuth tracks generated by recording first blocks of digital recording signals through the first head and second azimuth tracks generated by recording second blocks of digital recording signals through the second head are alternately formed on the magnetic recording medium. In this case, each of the tracks is extended in a track recording direction which is inclined with respect to the traveling direction of the magnetic recording medium at a track inclination angle.

In contrast, in cases where a plurality of input digital signals transmitted at a second data rate equal to 1/N the first data rate is processed in the signal processing means, the magnetic recording medium is driven at a second traveling speed equal to 1/N the first traveling speed, and the rotational cylinder is rotated at a second rotational speed of 1/N the first rotational speed. Therefore, the blocks of digital recording signals including the data rate information processed in the signal processing means are recorded on the magnetic recording medium. In this case, each block of digital recording signals is, for example, provided to the first or second head for each rotational period of N/2 rotations of the rotational cylinder and is recorded. Also, because a second speed ratio of the second traveling speed to the second rotational speed is equal to a first speed ratio of the first traveling speed to the first rotational speed, first azimuth tracks and second azimuth tracks of which arranging conditions are the same as those in case of the first data rate are formed on the magnetic recording medium in the same manner. That is, each of the first and second azimuth tracks is extended in the same track recording direction. In addition, because each block of digital recording signals is recorded on a first or second azimuth track having a fixed track length regardless of the data rate of the input digital signals, a minimum inversion interval of magnetic charges formed on the magnetic recording medium becomes constant regardless of the data rate of the input digital signals.

Thereafter, in cases where the blocks of digital recording signals including the data rate information recorded on the magnetic recording medium are read out from the magnetic recording medium, the data rate information are reproduced in the signal reproducing means and is detected in the data rate detecting means. In cases where the data rate information which is included in the input digital signals transmitted at the first data rate is detected, the data rate detecting means informs the tape traveling speed control means of the first data rate, and the magnetic recording medium is driven at the first traveling speed in the traveling direction in the same manner. Also, in cases where the data rate information which is included in the input digital signals transmitted at the second data rate is detected, the data rate detecting means informs the tape traveling speed control means of the second data rate, and the magnetic recording medium is driven at the second traveling speed in the traveling direction in the same manner. In this case, the rotational cylinder is rotated at the first rotational speed regardless of the data rate indicated by the data rate information.

Therefore, in cases where the magnetic recording medium is rotated at the first traveling speed, the first and second heads alternately trace the first and second azimuth tracks in a track reading direction which is the same as the track recording direction, and the blocks of digital recording signals are read from the magnetic recording medium on condition that the first blocks of digital recording signals are read through the first head and the second blocks of digital recording signals are read through the second head. In this case, an inversion cycle of the blocks of digital recording signals read is determined according to the minimum inversion interval of the magnetic charges. Thereafter, the blocks of digital recording signals are reproduced in the signal reproducing means at the inversion cycle of signals.

In contrast, in cases where the magnetic recording medium is rotated at the second traveling speed, because the rotational cylinder is not rotated at the second rotational speed but rotated at the first rotational speed, each of the first azimuth tracks is traced N times by the first head in a track reading direction differing from the track recording direction, and each of the second azimuth tracks is traced N times by the second head in the track reading direction. Therefore, each block of digital recording signals is read from the magnetic tape in N tracing operations of the first or second head. In this case, because the rotational cylinder is rotated at the first rotational speed in the same manner as in the first data rate, an inversion cycle of the blocks of digital recording signals read through the first and second heads is the same as that in the first data rate. Thereafter, each block of digital recording signals read in the N tracing operations are reproduced in the signal reproducing means at the same inversion cycle of signals.

Accordingly, even though the input digital signals transmitted at the first data rate or the second data rate are input, because the rotational speed of the rotational cylinder and the traveling speed of the magnetic recording medium are changed in the same manner according to the data rate of the input digital signals, the tracks can be formed on the magnetic recording medium in equal intervals regardless of the data rate of the input digital signals without any additional third head.

Also, because the blocks of digital recording signals are alternately provided to the first and second heads having different azimuth angles to form a series of tracks on the magnetic recording medium, azimuth angles of a pair of tracks adjacent to each other differ from each other. Therefore, crosstalk occurring in a pair of tracks adjacent to each other can be prevented, and the digital recording signals can be reproduced at a high quality.

Also, because the rotational speed of the rotational cylinder is fixed to the first rotational speed in a reproducing operation regardless of the data rate of the input digital signals on condition that the minimum inversion interval of the magnetic charges on the magnetic recording medium is fixed, an inversion cycle of the digital recording signals can be fixed to a prescribed value. Therefore, a plurality of waveform equalizing circuits respectively corresponding to a data rate of the input digital signals are not required in the signal reproducing means. In other words, the configuration of the signal reproducing means can be simplified.

BRIEF DESCRIPTION OF THE DRAWINGS

The objects, features and advantages of the present invention will be apparent from the following description taken in conjunction with the accompanying drawings, in which:

FIG. 11 is a timing chart of a plurality of blocks of digital recording signals processed in a signal recording system shown in FIG. 9 according to a first operation of the second embodiment;

FIG. 15 is a block diagram of a magnetic recording and reproducing apparatus according to a third embodiment of the present invention;

DETAIL DESCRIPTION OF THE EMBODIMENTS

Preferred embodiments of a magnetic recording and reproducing apparatus according to the present invention are described with reference to drawings.

Figure 1:
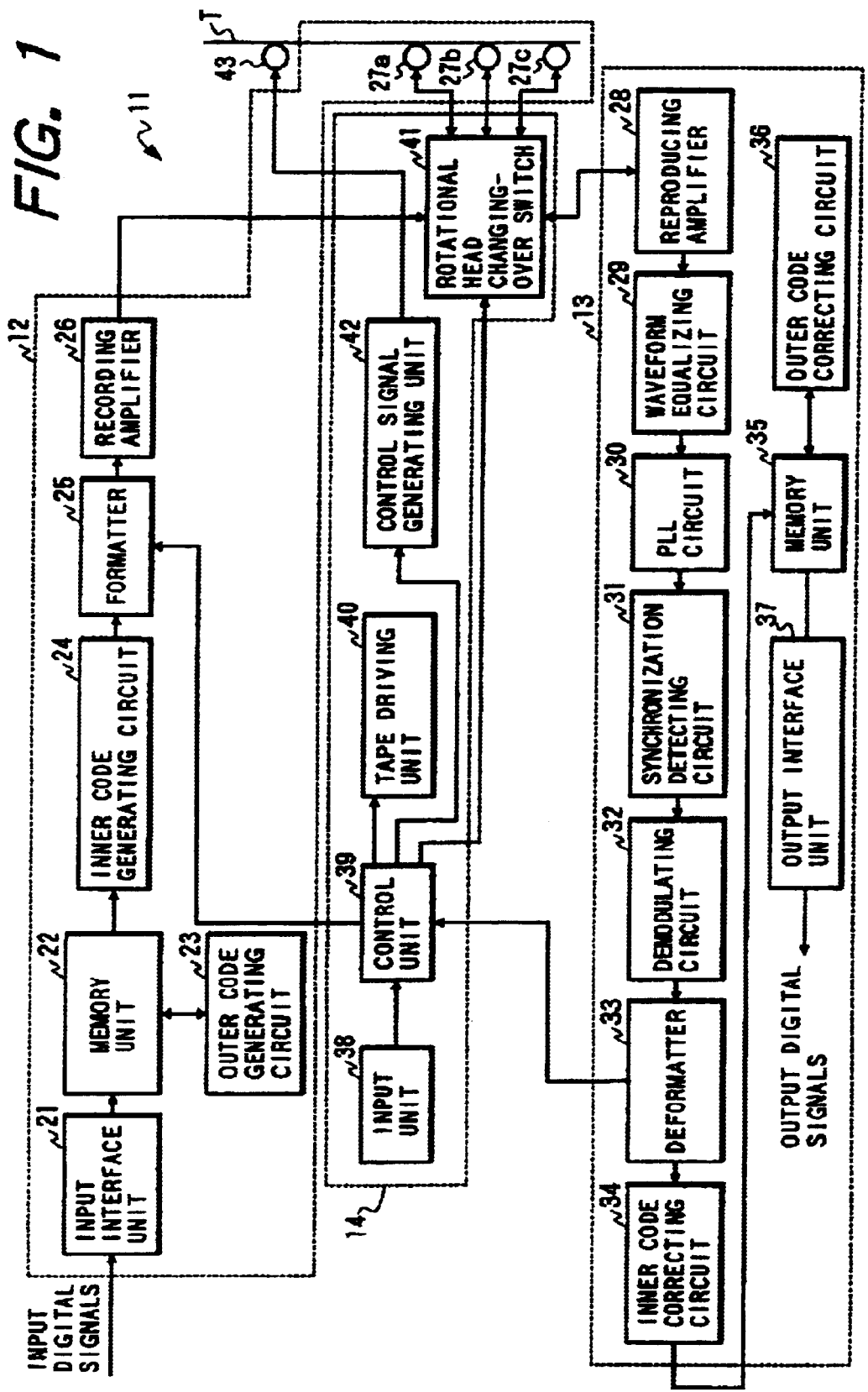
FIG. 1 is a block diagram of a magnetic recording and reproducing apparatus according to a first embodiment of the present invention.

FIG. 1 is a block diagram of a magnetic recording and reproducing apparatus according to a first embodiment of the present invention.

As shown in FIG. 1, a magnetic recording and reproducing apparatus 11 according to a first embodiment comprises a signal recording system 12 for recording a plurality of input digital signals Sin transmitted at a prescribed data rate through a transmission line (not shown) on a magnetic recording medium T such as a magnetic tape while forming a plurality of patterned tracks on the magnetic recording medium T, a signal reproducing system 13 for reproducing a plurality of digital signals recorded on the magnetic tape T in the signal recording system 12, and a control system 14 for controlling the signal recording system 12 and the traveling speed of the magnetic tape T according to input information in a recording operation and controlling the traveling speed of the magnetic tape T according to reproduced information obtained in the signal reproducing system 13 in a reproducing operation.

The signal recording system 12 comprises an input interface unit 21 for receiving the input digital signals Sin and converting the input digital signals Sin into a plurality of digital recording signals to be processed in the system 22, a memory unit 22 having first, second and third memories for storing each of blocks of digital recording signals received in the input interface unit 21 in one of the first, second and third memories in order, each block of digital recording signals being recorded in a track of the magnetic tape T, an external code generating circuit 23 for generating an external code denoting an error-correcting code for each block of digital recording signals stored in the memory unit 22 to detect an error in each block of digital recording signals in a reproducing operation according to an error detecting system and adding the external code to each block of digital recording signals of the memory unit 22, an inner code generating circuit 24 for generating an inner code denoting another error-correcting code for each block of digital recording signals transferred from the storing unit 22 to detect another error in each block of digital recording signals in a reproducing operation according to another error detecting system and adding the inner code to each corresponding block of digital recording signals, a formatter 25 for performing a recording modulation for the digital recording signals output from the inner code generating circuit 24 by adding a synchronization signal and an identification signal to each block of digital recording signals to record the digital recording signals on the magnetic tape T at a prescribed arrangement, a recording amplifier 26 for amplifying the digital recording signals modulated in the formatter 25 to a prescribed gain, and first, second and third rotational heads 27a, 27b and 27c for recording the modulated digital recording signals amplified in the recording amplifier 26 on the magnetic tape T in a recording operation and reproducing the digital recording signals recorded on the magnetic tape T in a reproducing operation, two of the rotational heads 27a, 27b and 27c being used according to the prescribed data rate of the input digital signals Sin.

The signal reproducing system 13 comprises a reproducing amplifier 28 for amplifying blocks of recording signals read from the magnetic tape T through one of the rotational heads 27a and 27b or one of the rotational heads 27b and 27c, each block of recording signals being read out from a track of the magnetic tape T, a waveform equalizing circuit 29 for shaping waveforms of the recording signals amplified in the reproducing amplifier 28, a phase locked loop (PLL) circuit 30 for extracting timing signals from the amplified recording signals shaped in the waveform equalizing circuit 29 and reproducing the blocks of digital recording signals composed of binary codes "0" and "1" from the amplified and shaped recording signals, a synchronization detecting circuit 31 for performing a synchronization detection for the series of digital recording signals output from the PLL circuit 30, a demodulating circuit 32 for demodulating the digital recording signals output from the synchronization detecting circuit 31, a deformatter 33 for detecting the identification signals added in the formatter 25 from the digital recording signals and rearranging the digital recording signals according to the identification signals, an inner code correcting circuit 34 for detecting an error from each of blocks of digital recording signals according to the inner code added in the generating circuit 24 and correcting each of blocks of digital recording signals, a memory unit 35 for storing the blocks of digital recording signals corrected in the inner code correcting circuit 34 one after another according to the identification signal, an external code correcting circuit 36 for detecting an error in each block of digital recording signals stored in the memory unit 35 according to the outer code added by the generating circuit 23 and correcting each block of digital recording signals, and an output interface 37 for converting the digital recording signals read out from the memory unit 35 into a plurality of output digital signals Sout transmitted at a desired outer data rate.

The control system 14 comprises an input unit 38 for inputting a traveling speed of the magnetic tape T designated by a user in a recording operation, a control unit 39 for generating a traveling speed information signal indicating the traveling speed of the magnetic tape T in a recording operation, providing the information signal for the formatter 25 to add the information signal to each block of digital recording signals as another identification signal in the formatter 25, generating a first tape driving control signal according to the information signal in a recording operation, receiving the information signal indicating the traveling speed of the magnetic tape T from the deformatter 33 in which the information signal is detected as the identification signal, and generating a second tape driving control signal according to the information signal in a reproducing operation, a tape driving unit 40 for controlling the driving of the magnetic tape T according to the first or second tape driving control signal generated in the control unit 39, a rotational head change-over switch 41 for selecting two rotational heads from the rotational heads 27a, 27b and 27c according to the first tape driving control signal generated in the control unit 39 to record the digital recording signals amplified in the recording amplifier 26 through the two rotational heads selected, a control signal generating unit 42 for generating a control signal according to a synchronization signal which is generated in a synchronization signal generator (not shown) or is separated from the input digital signals Sin, and a control head 43 for recording the control signal generated in the control signal generating unit 42 on a control track of the magnetic tape T in a recording operation and reproducing the control signal recorded in the control track of the magnetic tape T in a reproducing operation, the control signal reproduced being transmitted to the control unit 39 through the control signal generating unit 42 to control the travelling of the magnetic tape T in the tape driving unit 40.

Figure 2:
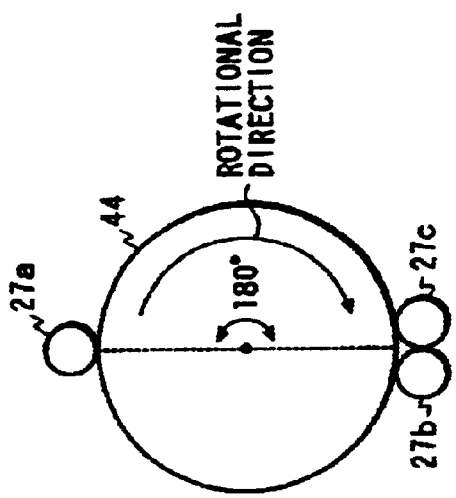
FIG. 2 shows the arrangement of rotational heads placed on a rotational drum according to the first embodiment.

FIG. 2 shows the arrangement of the rotational heads 27a, 27b and 27c placed on a rotational drum according to the first embodiment.

As shown in FIG. 2, the first rotational head 27a having a first azimuth angle, the second rotational head 27b having a second azimuth angle and the third rotational head 27c having the first azimuth angle are attached to a rotational drum 44. The second and third rotational heads 27b and 27c are placed close to each other to form a combination head and are placed opposite to the first rotational head 27a by almost an angle of 180 degrees. In this case, the second rotational head 27b (or the third rotational head 27c) is not placed opposite to the first rotational head 27a by just an angle of 180 degrees because of a mechanical attaching restriction. Therefore, a recording start time of the digital recording signals at each of the rotational heads 27a and 27b (or the rotational heads 27a and 27c) is made variable at need, and each of tracks formed by recording the digital recording signals transmitted through the rotational heads 27a and 27b (or the rotational heads 27a and 27c) is formed at the same height in a traveling direction of the magnetic tape T. Also, the second rotational head 27b is not placed far from the position of the third rotational head 27c by just an angle of 360 degrees because of a mechanical attaching restriction. In other words, the rotational heads 27b and 27c are not placed at the same position in a rotational direction of the rotational drum 44. Therefore, the second and third rotational heads 27b and 27c are placed with each other as close as possible, a recording start time of the digital recording signals at each of the rotational heads 27b and 27c is made variable at need, and each of tracks formed by recording the digital recording signals transmitted through the rotational heads 27b and 27c is formed at the same height in the traveling direction of the magnetic tape T.

A user sets a traveling speed of the magnetic tape T in the input unit 38 to a first (or standard) tape traveling speed ST1, a second tape traveling speed $ST2=1/(2N)*ST1$ equal to $1/(2N)$ (N is a natural number) the first tape traveling speed ST1 or a third tape traveling speed $ST3=1/(2N+1)*ST1$ equal to $1/(2N+1)$ the first tape traveling speed ST1.

In the above configuration of the magnetic recording and reproducing apparatus 11, a first operation that the input digital signals Sin transmitted at a standard (or first) data rate A (Mbits per second) are recorded while traveling the magnetic tape T at the first tape traveling speed ST1 corresponding to the standard data rate A is described. In this case, the rotational drum 44 is set to a fixed rotational speed.

First, the user inputs a traveling speed to the input unit 38 to designate the first tape traveling speed ST1. Thereafter, a traveling speed information signal indicating the first tape traveling speed ST1 is generated in the control unit 39 and is transmitted to the rotational head change-over switch 41 to alternately select the rotational heads 27a and 27b having the different azimuth angles. That is, any digital recording signal is not supplied to the third rotational head 27c. Also, the traveling speed information signal is transmitted to the tape driving unit 40, and the magnetic tape T is moved at the first tape traveling speed ST1. Therefore, a group of the control unit 39 and the tape driving unit 40 functions as a tape driving means.

The magnetic tape T is wound around the rotational drum 44 to cover half of the periphery of the rotational drum 44 with the magnetic tape T (that is, a winding angle is about 180 degrees). Therefore, when the rotational drum 44 is rotated by a half rotation, the first rotational head 27a having the first azimuth angle traces the magnetic tape T in a tracing direction inclined with respect to the traveling direction of the tape T to form a first track having a track width Wt (refer to FIG. 4). Thereafter, when the rotational drum 44 is again rotated by half-rotation, the second rotational head 27b having the second azimuth angle traces the magnetic tape T in the tracing direction to form a second track having the same track width Wt (refer to FIG. 4). In this case, the first tape traveling speed ST1 is set to form the first and second tracks adjacent to each other on the magnetic tape T without any overlapping.

Also, the traveling speed information signal is transmitted to the formatter 25, and the traveling speed information signal is recorded in the magnetic tape T with the digital recording signals.

Recording of blocks of digital recording signals processed in the signal recording system 12 according to the first operation is described with reference to FIGS. 3 and 4.

Figure 3:
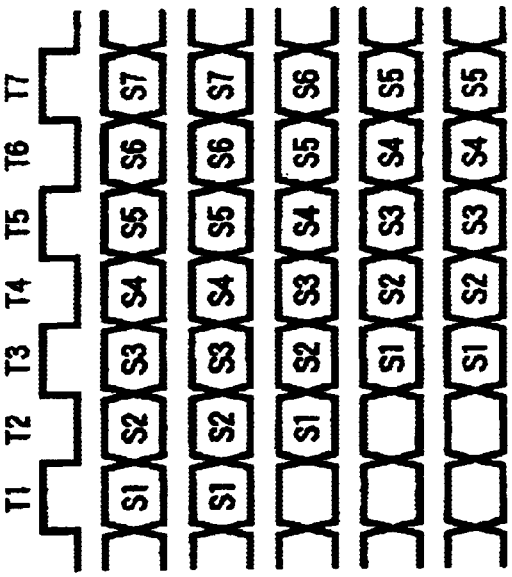
FIG. 3 is a timing chart of a plurality of blocks of digital recording signals processed in a signal recording system shown in FIG. 1 according to a first operation of the first embodiment.

FIG. 3 is a timing chart of a plurality of blocks of digital recording signals processed in the signal recording system 12 according to the first operation of the first embodiment. FIG. 4 shows a series of tracks formed on the magnetic tape T by recording the blocks of digital recording signals of which the timing chart is shown in FIG. 3.

As shown in FIG. 3, a first block of digital signals S1 processed in the input interface 21 is stored in the first memory of the memory unit 22 in a first half-rotation period T1 of the rotational drum 44 in synchronization with the rotation of the rotational drum 44. Thereafter, an outer code is generated for the first block of digital signals S1 in the outer code generating circuit 23 and is supplied to the first memory of the storing unit 22 in a second half-rotation period T2. Also, a second block of digital signals S2 processed in the input interface 21 is stored in the second memory of the memory unit 22 in the second half-rotation period T2 because the input digital signals Sin are transmitted at the standard data rate.

Thereafter, the first block of digital signals S1 is supplied to the inner code generating circuit 24 and an inner code is added to the digital signals S1. The first block of digital signals S1 is processed in the formatter 25 and the recording amplifier 26 in a third half-rotation period T3, and the first rotational head 27a is selected in the changing-over switch 41 and the first block of digital signals S1 modulated and amplified is recorded on the magnetic tape T through the first rotational head 27a in the third half-rotation period T3 to form a first track TR1, as shown in FIG. 4. Also, an outer code generated for the second block of digital signals S2 in the outer code generating circuit 23 is supplied to the second memory of the storing unit 22 in the third half-rotation period T3, and a third block of digital signals S3 processed in the input interface 21 is stored in the third memory of the memory unit 22 in the third half-rotation period T2.

Figure 4:
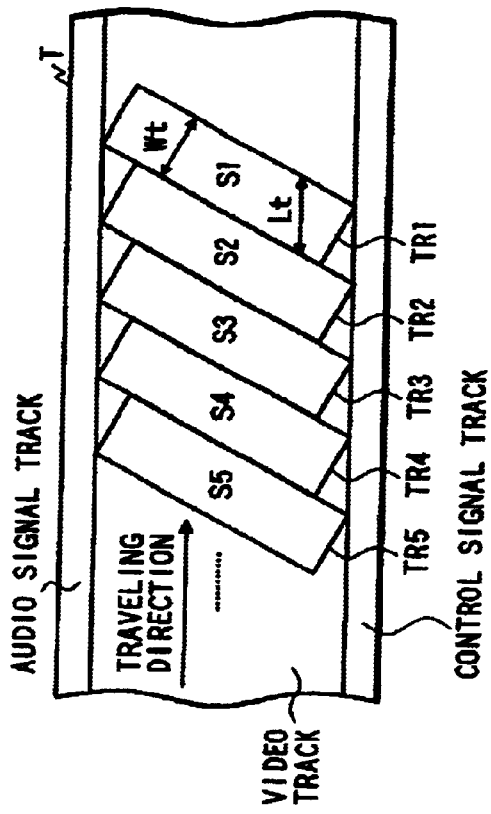
FIG. 4 shows a series of tracks formed on a magnetic tape by recording the blocks of digital recording signals of which the timing chart is shown in FIG. 3.

In the same manner, in a fourth half-rotation period T4, the second block of digital signals S2 is processed in the inner code generating circuit 24, the formatter 25 and the recording amplifier 26, the second rotational head 27b is selected in the changing-over switch 41, the second block of digital signals S2 modulated and amplified is recorded on the magnetic tape T through the second rotational head 27b to form a second track TR2, as shown in FIG. 4. In this case, because the magnetic tape T travels by a traveling length Lt corresponding to a track width Wt each time the rotational drum 44 is rotated by half of a rotation, the second track TR2 is adjacent to the first track TR1.

Also, in the fourth half-rotation period T4, an outer code generated for the third block of digital signals S3 is supplied to the third memory of the storing unit 22 and a fourth block of digital signals S4 processed in the input interface 21 is stored in the first memory of the memory unit 22.

Therefore, as shown in FIG. 4, alternate rows of the tracks TRi (i is an odd number) corresponding to the first rotational head 27a of the first azimuth angle and the tracks TRj (j is an even number) corresponding to the second rotational head 27b of the second azimuth angle can be formed on the magnetic tape T.

Reproduction of blocks of digital recording signals recorded in the magnetic tape T according to the first operation is described.

When a reproduction operation is started to reproduce the digital recording signals from the magnetic tape T, the rotational drum 44 is rotated at the same fixed rotational speed as that in the recording operation, the identification signal added in the formatter 25 is immediately read out from the magnetic tape T, and the traveling speed information signal which is generated in the control unit 39 in a recording operation and indicates the first traveling speed is separated from the identification signal in the deformatter 33 and is transmitted to the tape driving unit 40 and the changing-over switch 41 through the control unit 39. Therefore, the magnetic tape T is moved at the same traveling speed as that at which the digital recording signals are recorded, and the first and second rotatory heads 27a and 27b are alternately selected in a cycle of one half-rotation period of the rotational drum 44. That is, the blocks of digital signals recorded through the first rotational head 27a are read out through the same head 27a, and the blocks of digital signals recorded through the second rotational head 27b are read out through the same head 27b. Thereafter, the digital recording signals read out from the magnetic tape T are processed in the reproducing amplifier 28, the waveform equalization circuit 29, the PLL circuit 30, the synchronization detecting circuit 31, the demodulating circuit 32, deformatter 33, the inner code correcting circuit 34 and the outer code correcting circuit 36 and are output from the output interface 37 as the output digital signals Sout.

Next, a second operation that the input digital signals Sin transmitted at a second data rate A/2 (Mbits per second) equal to half the standard data rate A are recorded while traveling the magnetic tape T at the second tape traveling speed ST2=½*ST1 corresponding to the second data rate A/2 is described. In this case, the rotational drum 44 is set to the same fixed rotational speed as that in the first operation, and the data rate A/2 represents the second data rate A/(2N).

First, the user inputs a traveling speed to the input unit 38 to designate the second tape traveling speed ST2. Thereafter, a traveling speed information signal indicating the second tape traveling speed ST2 is generated in the control unit 39 and is transmitted to the rotational head change-over switch 41 to alternately select the rotational heads 27b and 27c having the different azimuth angles. That is, any digital recording signal is not supplied to the first rotational head 27a.

Also, the traveling speed information signal is transmitted to the tape driving unit 40, and the magnetic tape T is moved at the second tape traveling speed ST2. In this case, when the rotational drum 44 is rotated by one rotation, the second or third rotational head 27b or 27c traces the magnetic tape T in the first or latter half rotation of the rotational drum 44 to form a track on the magnetic tape T. Therefore, because the magnetic tape T travels by a traveling length Lt corresponding to a track width Wt each time the rotational drum 44 is rotated, a plurality of tracks adjacent to each other are formed on the magnetic tape T.

Also, the traveling speed information signal is transmitted to the formatter 25, and the traveling speed information signal is recorded in the magnetic tape T with the digital recording signals.

Recording of blocks of digital recording signals processed in the signal recording system 12 according to the second operation is described with reference to FIGS. 5 and 6.

Figure 5:
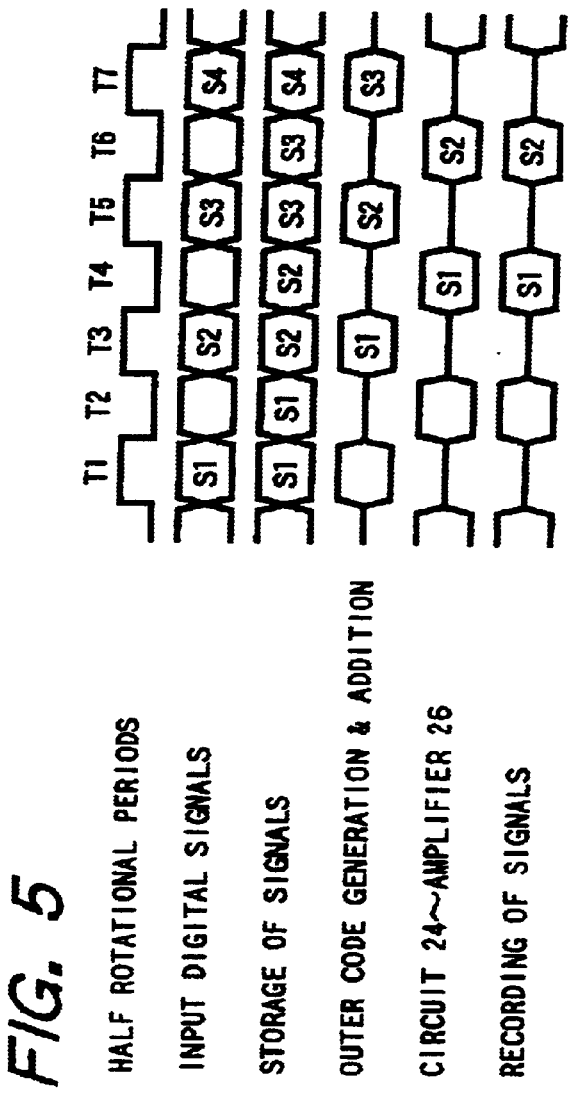
FIG. 5 is a timing chart of a plurality of blocks of digital recording signals processed in a signal recording system shown in FIG. 1 according to a second operation of the first embodiment.

FIG. 5 is a timing chart of a plurality of blocks of digital recording signals processed in the signal recording system 12 according to the second operation of the first embodiment. FIG. 6 shows a series of tracks formed on the magnetic tape T by recording the blocks of digital recording signals of which the timing chart is shown in FIG. 5.

As shown in FIG. 5, a first block of digital signals S1 processed in the input interface 21 is stored in the first memory of the memory unit 22 in a first half-rotation period T1 of the rotational drum 44 in synchronization with the rotation of the rotational drum 44. The storage of the first block of digital signals S1 is maintained in a second half-rotation period T2. Thereafter, an outer code is generated for the first block of digital signals S1 in the outer code generating circuit 23 and is supplied to the first memory of the storing unit 22 in a third half-rotation period T3. Also, a second block of digital signals S2 processed in the input interface 21 is stored in the second memory of the memory unit 22 in the third half-rotation period T3 because the input digital signals Sin are transmitted at the second data rate A/2.

Thereafter, the first block of digital signals S1 is supplied to the inner code generating circuit 24 and an inner code is added to the digital signals Si. The first block of digital signals S1 is processed in the formatter 25 and the recording amplifier 26 in a fourth half-rotation period T4, and the second rotational head 27b is selected in the changing-over switch 41 and the first block of digital signals S1 modulated and amplified is recorded on the magnetic tape T through the second rotational head 27b in the fourth half-rotation period T4 to form a first track TR1, as shown in FIG. 6. Also, the storage of the second block of digital signals S2 is maintained in the fourth half-rotation period T4.

Thereafter, an outer code is generated for the second block of digital signals S2 in the outer code generating circuit 23 and is supplied to the second memory of the storing unit 22 in a fifth half-rotation period T5. Also, a third block of digital signals S3 processed in the input interface 21 is stored in the third memory of the memory unit 22 in the fifth half-rotation period T5. In this case, though the magnetic tape T is traced by the first rotational head 27a in the fifth half-rotation period T5 as is shown by a dotted rectangle in FIG. 6 while a trace of the first rotational head 27a overlaps with the first track TR1, because any signal is not supplied to the first rotational head 27a, any track is not formed on the magnetic tape T.

Figure 6:
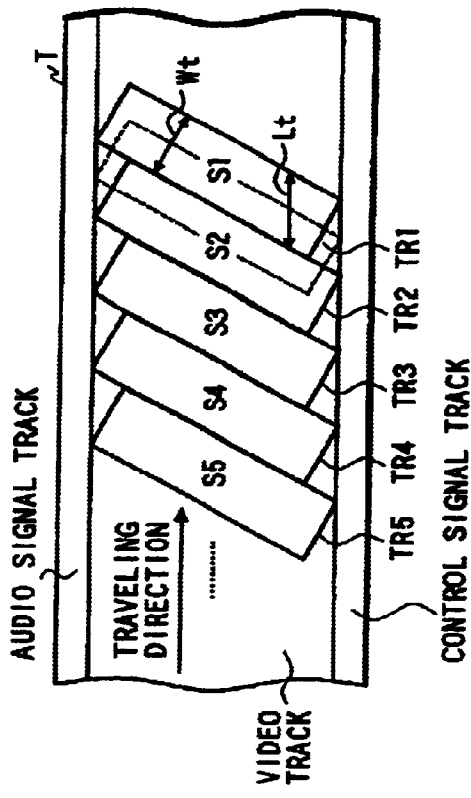
FIG. 6 shows a series of tracks formed on the magnetic tape by recording the blocks of digital recording signals of which the timing chart is shown in FIG. 5.

Thereafter, the second block of digital signals S2 is processed in the inner code generating circuit 24, the formatter 25 and the recording amplifier 26 in a sixth half-rotation period T6, and the third rotational head 27c is selected in the changing-over switch 41 and the second block of digital signals S2 modulated and amplified is recorded on the magnetic tape T through the third rotational head 27c in the sixth half-rotation period T6 to form a second track TR2, as shown in FIG. 6. In this case, because the magnetic tape T travels by the traveling length Lt corresponding to the track width Wt each time the rotational drum 44 is rotated by one rotation, the second track TR2 is adjacent to the first track TR1.

Therefore, as shown in FIG. 6, alternate rows of the tracks TRi (i is an odd number) corresponding to the second rotational head 27b of the second azimuth angle and the tracks TRj (j is an even number) corresponding to the third rotational head 27c of the first azimuth angle can be formed on the magnetic tape T.

Reproduction of blocks of digital recording signals recorded in the magnetic tape T according to the second operation is described.

When a reproduction operation is started to reproduce the digital recording signals from the magnetic tape T, the rotational drum 44 is rotated at the same fixed rotational speed as that in the recording operation, the identification signal added in the formatter 25 is immediately read out from the magnetic tape T, and the traveling speed information signal indicating the second traveling speed is separated from the identification signal in the deformatter 33 and is transmitted to the tape driving unit 40 and the changing-over switch 41 through the control unit 39. Therefore, the magnetic tape T is moved at the same traveling speed as that at which the digital recording signals are recorded, and the second and third rotary heads 27b and 27c are alternately selected in a cycle of two half-rotation periods of the rotational drum 44. That is, the blocks of digital signals recorded through the second rotational head 27b are read out through the same head 27b, and the blocks of digital signals recorded through the third rotational head 27c are read out through the same head 27c. Thereafter, the digital recording signals read out from the magnetic tape T are processed in the signal reproducing system 13 and are output from the output interface 37 as the output digital signals Sout.

Next, a third operation that the input digital signals Sin transmitted at a third data rate A/5 (Mbits per second) equal to ⅕ the standard data rate A are recorded while traveling the magnetic tape T at the third tape traveling speed ST3=⅕*ST1 corresponding to the third data rate A/5 as described. In this case, a rotational speed of the rotational drum 44 is set to the same fixed rotational speed as that in the first operation, and the data rate A/5 represents the third data rate A/(2N+1).

First, the user inputs a traveling speed to the input unit 38 to designate the third tape traveling speed ST3 ⅕*ST1. Thereafter, a traveling speed information signal indicating the third tape traveling speed ST3 is generated in the control unit 39 and is transmitted to the rotational head change-over switch 41 to alternately select the rotational heads 27a and 27b having the different azimuth angles each other. That is, any digital recording signal is not supplied to the third rotational head 27c.

Also, the traveling speed information signal is transmitted to the tape driving unit 40, and the magnetic tape T is moved at the third tape traveling speed ST3=⅕*ST1. In this case, any digital recording signal is not supplied to either the first or second rotational head 27a or 27b during two rotations of the rotational drum 44 after the first rotational head 27a (or the second rotational head 27b) traces the magnetic tape T in a half rotation of the rotational drum 44 to form a track on the magnetic tape T, and the second rotational head 27b (or the first rotational head 27a) traces the magnetic tape T in a half rotation of the rotational drum 44 to form another track on the magnetic tape T. Therefore, because the magnetic tape travels one track width Wt during two rotations and a half, a plurality of tracks adjacent to each other are formed on the magnetic tape T.

Also, the traveling speed information signal is transmitted to the formatter 25, and the traveling speed information signal is recorded in the magnetic tape T with the digital recording signals.

Recording of blocks of digital recording signals processed in the signal recording system 12 according to the third operation is described with reference to FIGS. 7 and 8.

Figure 7:
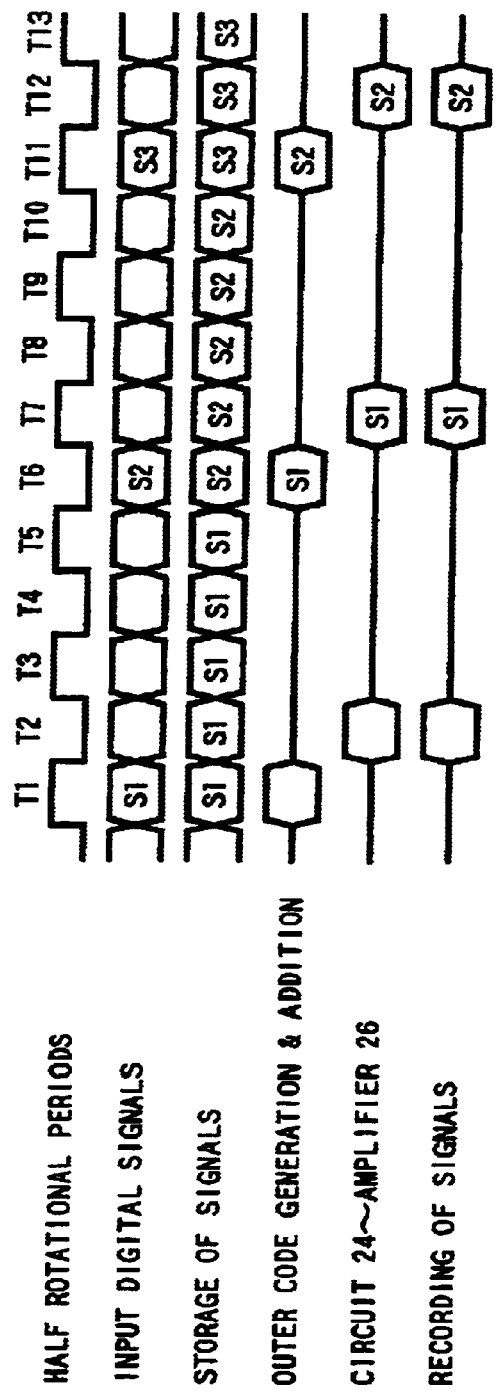
FIG. 7 is a timing chart of a plurality of blocks of digital recording signals processed in the signal recording system shown in FIG. 1 according to a third operation of the first embodiment.

FIG. 7 is a timing chart of a plurality of blocks of digital recording signals processed in the signal recording system 12 according to the third operation of the first embodiment. FIG. 8 shows a series of tracks formed on the magnetic tape T by recording the blocks of digital recording signals of which the timing chart is shown in FIG. 7.

As shown in FIG. 7, a first block of digital signals S1 processed in the input interface 21 is stored in the first memory of the memory unit 22 in a first half-rotation period T1 of the rotational drum 44 in synchronization with the rotation of the rotational drum 44. The storage of the first block of digital signals S1 is maintained for two rotations and a half of the rotational drum 44 ranging from the first to fifth half-rotation period T1 to T5. Thereafter, an outer code is generated for the first block of digital signals S1 in the outer code generating circuit 23 and is supplied to the first memory of the storing unit 22 in a sixth half-rotation period T6. Also, a second block of digital signals S2 processed in the input interface 21 is stored in the second memory of the memory unit 22 in the sixth half-rotation period T6 because the input digital signals Sin are transmitted at the third data rate A/5.

Thereafter, the first block of digital signals S1 is supplied to the inner code generating circuit 24 and an inner code is added to the digital signals S1. The first block of digital signals S1 is processed in the formatter 25 and the recording amplifier 26 in a seventh half-rotation period T7, and the first rotational head 27a is selected in the changing-over switch 41 and the first block of digital signals S1 modulated and amplified is recorded on the magnetic tape T through the first rotational head 27a in the seventh half-rotation period T7 to form a first track TR1, as shown in FIG. 8. Also, the storage of the second block of digital signals S2 is maintained for two rotations and a half of the rotational drum 44 ranging from the sixth to tenth half-rotation period T6 to T10.

Thereafter, an outer code is generated for the second block of digital signals S2 in the outer code generating circuit 23 and is supplied to the second memory of the storing unit 22 in an eleventh half-rotation period T11. Also, a third block of digital signals S3 processed in the input interface 11 is stored in the third memory of the memory unit 22 in the eleventh half-rotation period T11. Thereafter, the second block of digital signals S2 is processed in the inner code generating circuit 24, the formatter 25 and the recording amplifier 26 in a twelfth half-rotation period T12, and the second rotational head 27b is selected in the changing-over switch 41 and the second block of digital signals S2 modulated and amplified is recorded on the magnetic tape T through the second rotational head 27b in the twelfth half-rotation period T12 to form a second track TR2, as shown in FIG. 8. In this case, as is shown by four dotted rectangles in FIG. 8, though the magnetic tape T is traced by the second and third rotational heads 27b and 27c in eighth and tenth half-rotation periods T8 and T10 and is traced by the first rotational head 27a in ninth and eleventh half-rotation periods T9 and T11, because any signal is not supplied to the rotational heads during the eighth to eleventh half-rotation periods T8 and T11, any track is not formed on the magnetic tape T. Also, because the magnetic tape T travels by the traveling length Lt corresponding to the track width Wt each time the rotational drum 44 is rotated by two rotations and a half, the second track TR2 is adjacent to the first track TR1.

Figure 8:
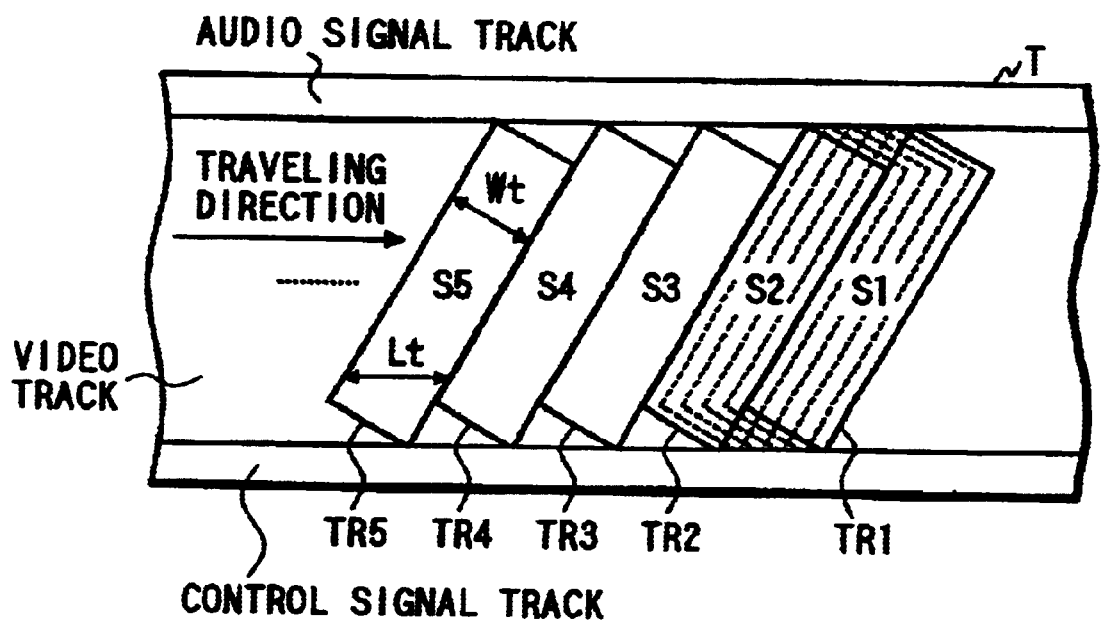
FIG. 8 shows a series of tracks formed on the magnetic tape by recording the blocks of digital recording signals of which the timing chart is shown in FIG. 7.

Therefore, as shown in FIG. 8, alternate rows of the tracks TRi (i is an odd number) corresponding to the first rotational head 27a of the first azimuth angle and the tracks TRj (j is an even number) corresponding to the second rotational head 27b of the second azimuth angle are formed on the magnetic tape T.

Reproduction of blocks of digital recording signals recorded in the magnetic tape T according to the third operation is described.

When a reproduction operation is started to reproduce the digital recording signals from the magnetic tape T, the rotational drum 44 is rotated at the same fixed rotational speed as that in the recording operation, the identification signal added in the formatter 25 is immediately read out from the magnetic tape T, and the traveling speed information signal indicating the third traveling speed is separated from the identification signal in the deformatter 33 and is transmitted to the tape driving unit 40 and the changing-over switch 41 through the control unit 39. Therefore, the magnetic tape T is moved at the same traveling speed as that at which the digital recording signals are recorded, and the first and second rotatory heads 27a and 27b are alternately selected in a cycle of five half-rotation periods of the rotational drum 44. That is, the blocks of digital signals recorded through the first rotational head 27a are read out through the same head 27a, and the blocks of digital signals recorded through the second rotational head 27b are read out through the same head 27b. Thereafter, the digital recording signals read out from the magnetic tape T are processed in the signal reproducing system 13 and are output from the output interface 37 as the output digital signals Sout.

Accordingly, even though the data rate of the input digital signals Sin input to the magnetic recording and reproducing apparatus 11 is changed to 1/N (N is a natural number) the standard data rate, in cases where the traveling speed of the magnetic tape T is changed to 1/N the standard traveling speed ST1 and a block of digital signals is read out from the memory unit 22 each time N half-rotation periods of the rotational drum 44 passes, the input digital signals Sin can be efficiently and reliably recorded on the magnetic tape T.

Also, because a traveling speed information signal indicating a traveling speed of the magnetic tape T which corresponds to the standard data rate, the second data rate or the third data rate at which the input digital signals Sin are input to the magnetic recording and reproducing apparatus 11 is recorded on the magnetic tape T with the input digital signals Sin regardless of the data rate of the input digital signals Sin, the digital recording signals recorded in the magnetic tape T can be read out at the same traveling speed of the magnetic tape T as that at which the digital recording signals are written in the magnetic tape T, and the output digital signals Sout which are the same as the input digital signals Sin can be reproduced.

In the second operation of the first embodiment, the input digital signals Sin transmitted at a second data rate A/2 equal to ½ the standard data rate A are representatively recorded and reproduced. Generally, in cases where the input digital signals Sin are transmitted at a second data rate A/(2N), the blocks of digital recording signals are alternately provided to the second rotational head 27b and the third rotational head 27c for each period of N rotations of the rotational drum 44 and are recorded on the magnetic tape T, and the blocks of digital recording signals recorded are alternately read through the second rotational head 27b and the third rotational head 27c for each period of N rotations of the rotational drum 44 and are reproduced.

In the third operation of the first embodiment, the input digital signals Sin transmitted at a third data rate A/5 equal to ⅕ the standard data rate A are representatively recorded and reproduced. Generally, in cases where the input digital signals Sin are transmitted at a third data rate A/(2N+1), the blocks of digital recording signals are alternately provided to the first rotational head 27a and the second rotational head 27b for each period of N rotations and a half of the rotational drum 44 and are recorded on the magnetic tape T, and the blocks of digital recording signals recorded are alternately read through the first rotational head 27a and the second rotational head 27b for each period of N rotations and a half of the rotational drum 44 and are reproduced.

Next, a second embodiment according to the present invention is described.

Figure 9:
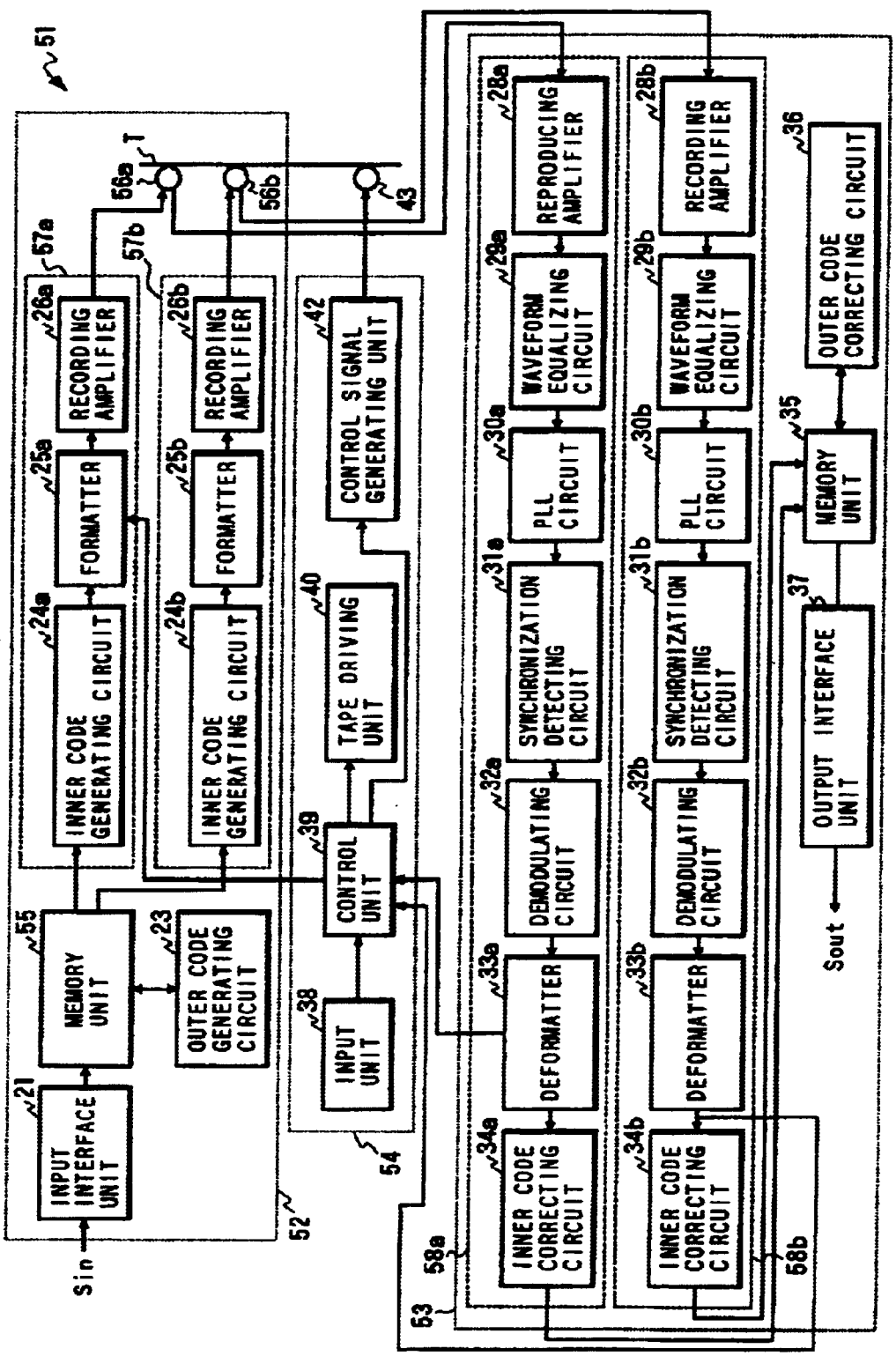
FIG. 9 is a block diagram of a magnetic recording and reproducing apparatus according to a second embodiment of the present invention.

FIG. 9 is a block diagram of a magnetic recording and reproducing apparatus according to a second embodiment of the present invention.

As shown in FIG. 9, a magnetic recording and reproducing apparatus 51 according to a second embodiment comprises a signal recording system 52 for recording a plurality of input digital signals Sin transmitted at a prescribed data rate through a transmission line (not shown) on the magnetic tape T while forming a plurality of patterned tracks on the magnetic tape T, a signal reproducing system 53 for reproducing a plurality of digital signals recorded on the magnetic tape T in the signal recording system 52, and a control system 54 for controlling the signal recording system 52 and the traveling speed of the magnetic tape T according to input information in recording operation and controlling the traveling speed of the magnetic tape T according to reproduced information obtained in the signal reproducing system 53 in a reproducing operation.

The signal recording system 52 comprises the input interface unit 21, a memory unit 55 having first, second, third and fourth memories for storing each of blocks of digital signals received in the input interface unit 21 in one of the memories in order, the outer code generating circuit 23 for supplying the outer code to each corresponding memory of the memory unit 55, a pair of inner code generating circuits 24a and 24b arranged in parallel for respectively adding the inner code to each block of digital signals, a pair of formatters 25a and 25b arranged in parallel for alternately receiving the blocks of digital recording signals output from the inner code generating circuit 24 and performing a recording modulation for each block of digital recording signals by adding a synchronization signal and an identification signal to each block of digital recording signals to record the digital recording signals on the magnetic tape T at a prescribed arrangement, a pair of recording amplifiers 26a and 26b arranged in parallel for respectively amplifying the digital recording signals modulated in the formatter 25a or 25b to a prescribed gain, a first rotational head 56a for recording the modulated digital recording signals amplified in the recording amplifier 26a on the magnetic tape T in a recording operation and reproducing the digital recording signals recorded on the magnetic tape T in a reproducing operation, and a second rotational head 56b for recording the modulated digital recording signals amplified in the recording amplifier 26b on the magnetic tape T in the recording operation and reproducing the digital recording signals recorded on the magnetic tape T in the reproducing operation.

The signal reproducing system 53 comprises a pair of reproducing amplifiers 28a and 28b arranged in parallel for alternately receiving blocks of digital recording signals obtained by scanning the magnetic tape T with the rotational heads 56a and 56b, amplifying the digital recording signals, a pair of waveform equalizing circuits 29a and 29b arranged in parallel for respectively shaping waveforms of the digital recording signals amplified in the reproducing amplifier 28a or 28b, a pair of PLL circuits 30a and 30b arranged in parallel for respectively extracting timing signals from the amplified digital recording signals shaped in the waveform equalizing circuit 29a or 29b and respectively reproducing a series of digital signals composed of binary codes "0" and "1" from the amplified and shaped digital recording signals, a pair of synchronization detecting circuits 31a and 31b arranged in parallel for respectively performing a synchronization detection for the series of digital recording signals output from the PLL circuit 30a or 30b, a pair of demodulating circuits 32a and 32b arranged in parallel for respectively demodulating the digital recording signals output from the synchronization detecting circuit 31a or 31b, a pair of deformatters 33a and 33b arranged in parallel for respectively detecting the identification signals added in the formatter 25a or 25b from the digital recording signals and respectively rearranging the digital recording signals according to the identification signals, a pair of inner code correcting circuits 34a and 34b for respectively correcting each block of digital recording signals rearranged in the deformatter 33a or 33b according to the inner code added in the generating circuit 24, the memory unit 35, the outer code correcting circuit 36, and the output interface 37.

The control system 54 comprises the input unit 38, the control unit 39 for providing the information signal for the formatters 25a and 25b to add the information signal to each block of digital recording signals as another identification signal and receiving the information signal indicating the traveling speed of the magnetic tape T from the deformatters 33a and 33b, the tape driving unit 40, the control signal generating unit 42, and the control head 43.

A first route recording system 57a is composed of the inner code generating circuit 24a, the formatter 25a and the recording amplifier 26a, and a second route recording system 57b is composed of the inner code generating circuit 24b, the formatter 25b and the recording amplifier 26b. Odd-numbered blocks of digital recording signals are processed in the first route recording system 57a and are recorded on the magnetic tape T through the first rotational head 56a. Even-numbered blocks of digital recording signals are processed in the second route recording system 57b and are recorded on the magnetic tape T through the second rotational head 56b.

A first route reproducing system 58a is composed of the reproducing amplifier 28a, the waveform equalizing circuit 29a, the PLL circuit 30a, the synchronization detecting circuit 31a, the demodulating circuit 32a, the deformatter 33a and the inner code correcting circuit 34a, and a second route reproducing system 58b is composed of the reproducing amplifier 28b, the waveform equalizing circuit 29b, the PLL circuit 30b, the synchronization detecting circuit 31b, the demodulating circuit 32b, the deformatter 33b and the inner code correcting circuit 34b. Odd-numbered blocks of digital recording signals reproduced from the magnetic tape T through the first rotational head 56a are processed in the first route reproducing system 58a. Even-numbered blocks of digital recording signals reproduced from the magnetic tape T through the second rotational head 56b are processed in the second route reproducing system 58b.

Figure 10:
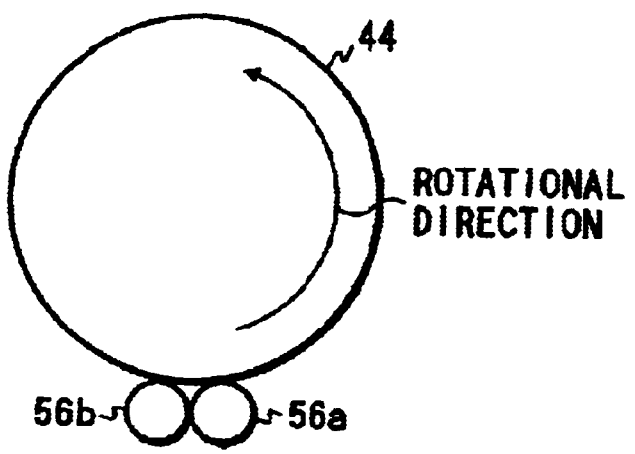
FIG. 10 shows the arrangement of rotational heads placed on a rotational drum according to the second embodiment.

FIG. 10 shows the arrangement of the rotational heads 56a and 56b placed on a rotational drum according to the second embodiment.

As shown in FIG. 10, the first rotational head 56a having a first azimuth angle and the second rotational head 56b having a second azimuth angle are attached to the rotational drum 44. The first and second rotational heads 56a and 56b are spaced by a track width in a direction perpendicular to a rotational direction of the rotational drum 44 and form a combination head. In this case, the first and second rotational heads 56a and 56b are not placed at the same position in the rotational direction because of a mechanical attaching restriction. Therefore, the first and second rotational heads 56a and 56b are placed with each other as close as possible in the rotational direction, a recording start time of the digital recording signals at each of the rotational heads 56a and 56b is made variable at need, and a pair of tracks formed by recording the digital recording signals transmitted through the rotational heads 56a and 56b are arranged adjacent to each other in a set in the traveling direction of the magnetic tape T.

A user sets a traveling speed of the magnetic tape T in the input unit 38 to a first (or standard) tape traveling speed ST1 or a second tape traveling speed ST2=1/N*ST1 equal to 1/N (N is a natural number) of the first tape traveling speed ST1.

In the above configuration of the magnetic recording and reproducing apparatus 51, a first operation that the input digital signals Sin transmitted at a standard (or first) data rate A (Mbits per second) are recorded while traveling the magnetic tape T at the first tape traveling speed ST1 corresponding to the standard data rate A is described. In his case, the rotational drum 44 is set to a fixed rotational speed.

First, the user inputs a traveling speed to the input unit 38 to designate the first tape traveling speed ST1. Thereafter, a traveling speed information signal indicating the first tape traveling speed ST1 is generated in the control unit 39 and is transmitted to the tape driving unit 40 and the formatters 25a and 25b. Therefore, the magnetic tape T is moved at the first tape traveling speed ST1, and the traveling speed information signal is recorded in the magnetic tape T with the digital recording signals.

Figure 12:
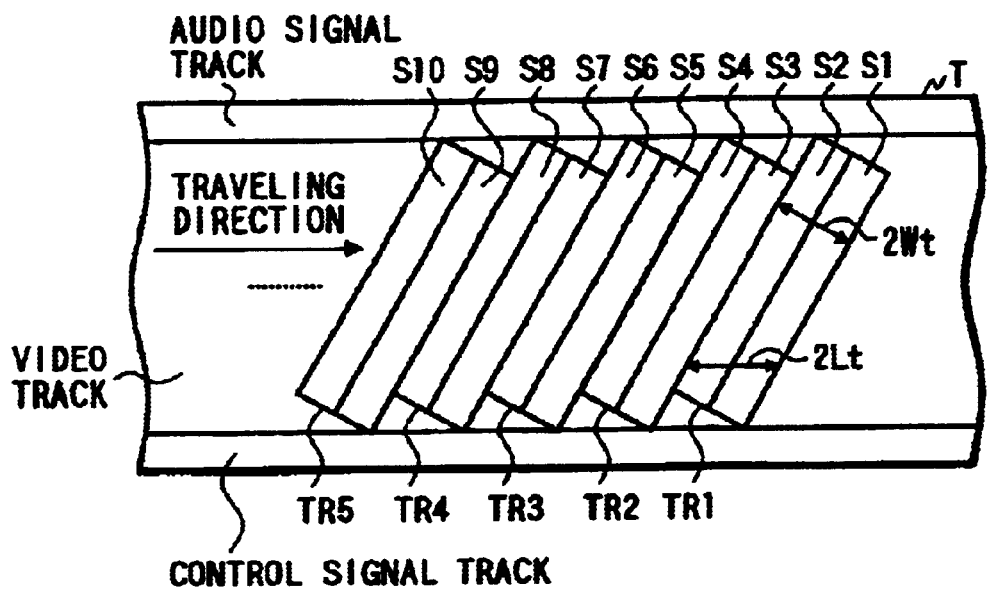
FIG. 12 shows a series of sets of tracks formed on the magnetic tape by recording the blocks of digital recording signals of which the timing chart is shown in FIG. 11.

In this case, when the rotational drum 44 is rotated by one rotation, the first and second rotational heads 56a and 56b having the different azimuth angles trace the magnetic tape T in a tracing direction inclined with respect to the traveling direction of the tape T to form a first set of tracks having a double track width 2*Wt (refer to FIG. 12). Thereafter, when the rotational drum 44 is again rotated by one rotation, the first and second rotational heads 56a and 56b having the different azimuth angles trace the magnetic tape T in the tracing direction to form a second set of tracks having the same double track width 2*Wt (refer to FIG. 12). In this case, the first tape traveling speed ST1 is set to form the first set of tracks and the second set of tracks adjacent to each other on the magnetic tape T.

Recording of blocks of digital recording signals processed in the signal recording system 52 according to the first operation is described with reference to FIGS. 11 and 12.

FIG. 11 is a timing chart of a plurality of blocks of digital recording signals processed in the signal recording system 52 according to the first operation of the second embodiment. FIG. 12 shows a series of sets of tracks formed on the magnetic tape T by recording the blocks of digital recording signals of which the timing chart is shown in FIG. 11.

As shown in FIG. 11, a first block of digital signals S1 processed in the input interface 21 is stored in the first memory of the memory unit 55 in a first half-rotation period T1 of the rotational drum 44 in synchronization with the rotation of the rotational drum 44. Thereafter, an outer code is generated for the first block of digital signals S1 in the outer code generating circuit 23 and is supplied to the first memory of the storing unit 55 in a second half-rotation period T2. Also, a second block of digital signals S2 processed in the input interface 21 is stored in the second memory of the memory unit 55 in the second half-rotation period T2 because the input digital signals Sin are transmitted at the standard data rate A.

Thereafter, an outer code is generated for the second block of digital signals S2 in the outer code generating circuit 23 and is supplied to the second memory of the storing unit 55 in a third half-rotation period T3. Also, a third block of digital signals S3 processed in the input interface 21 is stored in the third memory of the memory unit 55 in the third half-rotation period T3.

Thereafter, in a fourth half-rotation period T4, the first block of digital signals S1 is processed in the first route recording system 57a and the second block of digital signals S2 is processed in the second route recording system 57b. The first block of digital signals S1 modulated and amplified is recorded on the magnetic tape T through the first rotational head 56a and the second block of digital signals S2 modulated and amplified is recorded on the magnetic tape T through the second rotational head 56b. Therefore, a first set of tracks TR1 is formed on the magnetic tape T. Also, an outer code generated for the third block of digital signals S3 in the outer code generating circuit 23 is supplied to the third memory of the storing unit 55, and a fourth block of digital signals S4 processed in the input interface 21 is stored in the fourth memory of the memory unit 55.

Thereafter, in a fifth half-rotation period T5, an outer code generated for the fourth block of digital signals S4 in the outer code generating circuit 23 is supplied to the fourth memory of the storing unit 55, and a fifth block of digital signals S5 processed in the input interface 21 is stored in the first memory of the memory unit 55.

Thereafter, in a sixth half-rotation period T6, the third block of digital signals S3 is processed in the first route recording system 57a and the fourth block of digital signals S4 is processed in the second route recording system 57b. The third block of digital signals S3 modulated and amplified is recorded on the magnetic tape T through the first rotational head 56a and the fourth block of digital signals S4 modulated and amplified is recorded on the magnetic tape T through the second rotational head 56b. Therefore, a second set of tracks TR2 is formed on the magnetic tape T.

In this case, because the magnetic tape T travels by a double traveling length 2*Lt corresponding to a double track width 2*Wt each time the rotational drum 44 is rotated by one rotation, the second set of tracks TR2 is adjacent to the first set of tracks TR1. Therefore, as shown in FIG. 12, a series of sets of tracks TRi (i is a natural number) can be formed on the magnetic tape T.

Reproduction of blocks of digital recording signals recorded in the magnetic tape T according to the first operation of the second embodiment is described.

When a reproduction operation is started to reproduce the digital recording signals from the magnetic tape T, the rotational drum 44 is rotated at the same fixed rotational speed as that in the recording operation, the identification signals added in the formatters 25a and 25b are immediately read out from the magnetic tape T, and the traveling speed information signal which is generated in the control unit 39 in the recording operation and indicates the first traveling speed is separated from the identification signal in the deformatters 33a and 33b and is transmitted to the tape driving unit 40. Therefore, the magnetic tape T is moved at the same traveling speed as that at which the digital recording signals are recorded.

Thereafter, odd-numbered blocks of digital recording signals read out from the first tracks of the sets of tracks of the magnetic tape T through the first rotational head 56a are reproduced in the first route reproducing system 58a and are output from the output interface 37 as the output digital signals Sout. Also, even-numbered blocks of digital recording signals read out from the latter tracks of the sets of tracks of the magnetic tape T through the second rotational head 56b are processed in the second route reproducing system 58b and are output from the output interface 37 as the output digital signals Sout.

Next, a second operation that the input digital signals Sin transmitted at a second data rate A/2 (Mbits per second) equal to half the standard data rate A are recorded while traveling the magnetic tape T at the second tape traveling speed ST2=½*ST1 corresponding to the second data rate A/2 is described according to the second embodiment. In this case, the rotational drum 44 is set to the same fixed rotational speed as that in the first operation of the second embodiment, and the data rate A/2 represents the second data rate 1/N*A.

First, the user inputs a traveling speed to the input unit 38 to designate the second tape traveling speed ST2. Thereafter, a traveling speed information signal indicating the second tape traveling speed ST2 is generated in the control unit 39 and is transmitted to the tape driving unit 40 and the formatters 25a and 25b. Therefore, the magnetic tape T is moved at the second tape traveling speed ST2, and the traveling speed information signal is recorded in the magnetic tape T with the digital recording signals.

Recording of blocks of digital recording signals processed in the signal recording system 52 according to the second operation is described with reference to FIGS. 13 and 14.

Figure 13:
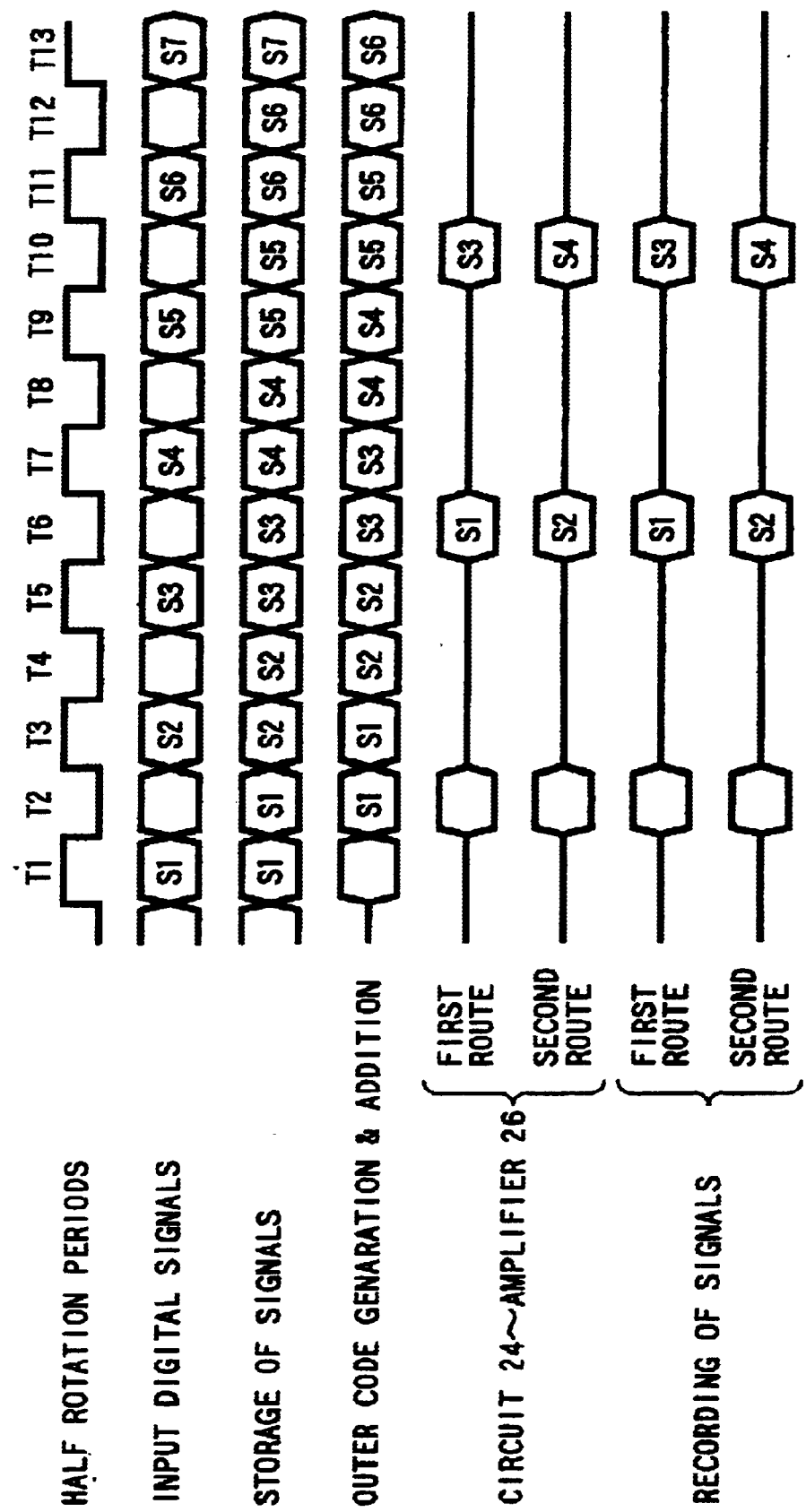
FIG. 13 is a timing chart of a plurality of blocks of digital recording signals processed in signal recording system according to a second operation of the second embodiment.

FIG. 13 is a timing chart of a plurality of blocks of digital recording signals processed in the signal recording system 52 according to the second operation of the second embodiment. FIG. 14 shows a series of sets of tracks formed on the magnetic tape T by recording the blocks of digital recording signals of which the timing chart is shown in FIG. 13.

As shown in FIG. 13, a first block of digital signals S1 processed in the input interface 21 is stored in the first memory of the memory unit 55 in a first half-rotation period T1 of the rotational drum 44 in synchronization with the rotation of the rotational drum 44. Thereafter, the first block of digital signals S1 is remained in the first memory in a second half-rotation period T2, and an outer code is generated for the first block of digital signals S1 in the outer code generating circuit 23 and is supplied to the first memory of the storing unit 55 in a third half-rotation period T3. Also, a second block of digital signals S2 processed in the input interface 21 is stored in the second memory of the memory unit 55 in the third half-rotation period T3 because the input digital signals Sin are transmitted at the second data rate A/2. The second block of digital signals S2 is remained in the second memory in a fourth half-rotation period T4.

Thereafter, an outer code is generated for the second block of digital signals S2 in the outer code generating circuit 23 and is supplied to the second memory of the storing unit 55 in a fifth half-rotation period T5. Also, a third block of digital signals S3 processed in the input interface 21 is stored in the third memory of the memory unit 55 in the fifth half-rotation period T5.

Thereafter, in a sixth half-rotation period T6, the first block of digital signals S1 is processed in the first route recording system 57a and the second block of digital signals S2 is processed in the second route recording system 57b. The first block of digital signals S1 modulated and amplified is recorded on the magnetic tape T through the first rotational head 56a and the second block of digital signals S2 modulated and amplified is recorded on the magnetic tape T through the second rotational head 56b. Therefore, a first set of tracks TR1 is formed on the magnetic tape T. Also, the third block of digital signals S3 is remained in the third memory.

Thereafter, in a seventh half-rotation period T7, an outer code generated for the third block of digital signals S3 in the outer code generating circuit 23 is supplied to the third memory of the storing unit 55, and a fourth block of digital signals S4 processed in the input interface 21 is stored in the fourth memory of the memory unit 55. The fourth block of digital signals S4 is remained in the fourth memory in an eighth half-rotation period T8.

Thereafter, in a ninth half-rotation period T9, an outer code generated for the fourth block of digital signals S4 in the outer code generating circuit 23 is supplied to the fourth memory of the storing unit 55, and a fifth block of digital signals S5 processed in the input interface 21 is stored in the first memory of the memory unit 55.

Thereafter, in a tenth half-rotation period T10, the third block of digital signals S3 is processed in the first route recording system 57a and the fourth block of digital signals S4 is processed in the second route recording system 57b. The third block of digital signals S3 modulated and amplified is recorded on the magnetic tape T through the first rotational head 56a and the fourth block of digital signals S4 modulated and amplified is recorded on the magnetic tape T through the second rotational head 56b. Therefore, a second set of tracks TR2 is formed on the magnetic tape T.

In this case, because the magnetic tape T travels by the double traveling length 2*Lt corresponding to the double track width 2*Wt each time the rotational drum 44 is rotated by two rotations, the second set of tracks TR2 is adjacent to the first set of tracks TR1. Therefore, as shown in FIG. 14, a series of sets of tracks TRi (i is a natural number) can be formed on the magnetic tape T.

Reproduction of blocks of digital recording signals recorded in the magnetic tape T according to the second operation of the second embodiment is described.

When a reproduction operation is started to reproduce the digital recording signals from the magnetic tape T, the rotational drum 44 is rotated at the same fixed rotational speed as that in the recording operation, the identification signals added in the formatters 25a and 25b are immediately read out from the magnetic tape T, and the traveling speed information signal which is generated in the control unit 39 in the recording operation and indicates the second traveling speed is separated from the identification signal in the deformatters 33a and 33b and is transmitted to the tape driving unit 40. Therefore, the magnetic tape T is moved at the same second traveling speed as that at which the digital recording signals are recorded.

Thereafter, odd-numbered blocks of digital recording signals read out from the first tracks of the sets of tracks of the magnetic tape T through the first rotational head 56a are reproduced in the first route reproducing system 58a and are output from the output interface 37 as the output digital signals Sout. Also, even-numbered blocks of digital recording signals read out from the latter tracks of the sets of tracks of the magnetic tape T through the second rotational head 56b are processed in the second route reproducing system 58b and are output from the output interface 37 as the output digital signals Sout.

Accordingly, even though the data rate of the input digital signals Sin input to the magnetic recording and reproducing apparatus 51 is changed to 1/N (N is a natural number) the standard data rate, in cases where the traveling speed of the magnetic tape T is changed to 1/N the standard traveling speed ST1 and a block of digital signals is read out from the memory unit 22 each time the rotational drum 44 is rotated N times, the input digital signals Sin can be efficiently and reliably recorded on the magnetic tape T.

Also, because a traveling speed information signal indicating a traveling speed of the magnetic tape T which corresponds to the data rate of the input digital signals Sin is recorded on the magnetic tape T with the input digital signals Sin regardless of the data rate of the input digital signals Sin, the digital recording signals recorded in the magnetic tape T can be read out at the same traveling speed of the magnetic tape T as that at which the digital recording signals are written in the magnetic tape T, and the output digital signals Sout which are the same as the input digital signals Sin can be reproduced.

Also, even though the data rate of the input digital signals Sin input to the magnetic recording and reproducing apparatus 51 is changed to 1/N (N is a natural number) the standard data rate, the input digital signals Sin can be efficiently recorded and reproduced in the magnetic recording and reproducing apparatus 51 in which only the pair of rotary heads 56a and 56b are provided and any rotational head change-over switch is not required because the pair of rotary heads 56a and 56b are always used regardless of the data rate of the input digital signals Sin.

In the second operation of the second embodiment, the input digital signals Sin transmitted at a second data rate A/2 equal to ½ the standard data rate A are representatively recorded and reproduced. Generally, in cases where the input digital signals Sin are transmitted at a second data rate A/N, a pair of blocks of digital recording signals are simultaneously provided to the first and second rotational heads 56a and 56b for each period of N rotations of the rotational drum 44 and are simultaneously recorded on the magnetic tape T, and a pair of blocks of digital recording signals recorded are simultaneously read through the first and second rotational heads 56a and 56b for each period of N rotations of the rotational drum 44 and are reproduced. Next, a third embodiment according to the present invention is described.

FIG. 15 is a block diagram of a magnetic recording and reproducing apparatus according to a third embodiment of the present invention.

As shown in FIG. 15, a magnetic recording and reproducing apparatus 61 according to a third embodiment comprises a signal recording system 62 for recording a plurality of input digital signals Sin transmitted at a prescribed data rate, the signal reproducing system 53 for reproducing a plurality of digital signals recorded on the magnetic tape T in the signal recording system 62, and a control system 63 for controlling the signal recording system 62 and the traveling speed of the magnetic tape T according to input information in a recording operation and controlling the traveling speed of the magnetic tape T according to reproduced information obtained in the signal reproducing system 53 in a reproducing operation.

The signal recording system 62 comprises the input interface unit 21, a memory unit 64 having first, second, third, fourth, fifth and sixth memories for storing each of blocks of digital signals received in the input interface unit 21 in one of the memories in order, the first route recording system 57a, the second route recording system 57b, first and second rotational heads 65a and 65b for recording the digital recording signals modulated and amplified in the first route recording system 57a on the magnetic tape T in a recording operation and reproducing the digital recording signals recorded through the first route recording system 57a on the magnetic tape T in a reproducing operation, and third and fourth rotational head 65c and 65d for recording the digital recording signals modulated and amplified in the second route recording system 57b on the magnetic tape T in a recording operation and reproducing the digital recording signals recorded through the second route recording system 57b on the magnetic tape T in a reproducing operation.

The control system 63 comprises the input unit 38, the control unit 39, the tape driving unit 40, the control signal generating unit 42, the control head 43, a first rotational head change-over switch 66a for selecting the first rotational head 65a or alternately selecting the first and second rotational heads 65a and 65b according to the first or second tape driving control signal generated in the control unit 39 to record the digital recording signals through the selected rotational head or heads, and a second rotational head change-over switch 66b for selecting the third rotational head 65c or alternately selecting the third and fourth rotational heads 65c and 65d according to the first or second tape driving control signal generated in the control unit 39 to record the digital recording signals through the selected rotational head or heads.

Figure 16:
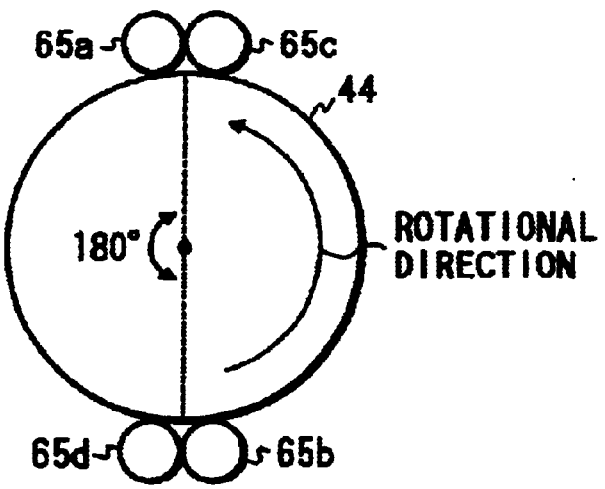
FIG. 16 shows the arrangement of rotational heads placed on the rotational drum according to the third embodiment.

FIG. 16 shows the arrangement of the rotational heads 65a to 65d placed on the rotational drum 44 according to the third embodiment.

As shown in FIG. 16, the first and second rotational heads 65a and 65b respectively having a first azimuth angle and the third and fourth rotational heads 65c and 65d respectively having a second azimuth angle are attached to the rotational drum 44. The first and third rotational heads 65a and 65c are spaced by a track width in a spacing direction perpendicular to a rotational direction of the rotational drum 44 and form a first combination head. The third and fourth rotational heads 65c and 65d are spaced by a track width in the spacing direction and form a second combination head. The first combination head is opposite to the second combination head. That is, the first combination head is spaced from the second combination head by an angle of 180 degrees. In this case, the first and third rotational heads 65a and 65c cannot be placed at the same position in the rotational direction because of a mechanical attaching restriction. Therefore, the first and third rotational heads 65a and 65c are placed with each other as close as possible in the rotational direction, a recording start time of the digital recording signals at each of the rotational heads 65a and 65c is made variable at need, and a pair of tracks formed by recording the digital recording signals transmitted through the rotational heads 65a and 65c are arranged adjacent to each other in a set in the traveling direction of the magnetic tape T. In the same manner, the second and fourth rotational heads 65b and 65d are placed with each other as close as possible in the rotational direction.

A user sets a traveling speed of the magnetic tape T in the input unit 38 to a first (or standard) tape traveling speed ST1 or a second tape traveling speed ST2=2*ST1 twice as high as the first tape traveling speed ST1.

In the above configuration of the magnetic recording and reproducing apparatus 61, a first operation that the input digital signals Sin transmitted at a standard (or first) data rate A (Mbits per second) are recorded while traveling the magnetic tape T at the first tape traveling speed ST1 corresponding to the standard data rate A is described. In this case, the rotational drum 44 is set to a fixed rotational speed.

First, the user inputs a traveling speed to the input unit 38 to designate the first tape traveling speed ST1. Thereafter, a traveling speed information signal indicating the first tape traveling speed ST1 is generated in the control unit 39 and is transmitted to the rotational head change-over switches 66a and 66b. Therefore, the first and third rotational heads 65a and 65c having the different azimuth angles are selected in the change-over switches 66a and 66b. That is, any digital recording signal is not supplied to either the second or fourth rotational head 65b or 65d. Also, the traveling speed information signal is transmitted to the tape driving unit 40 and the formatters 25a and 25b. Therefore, the magnetic tape T is moved at the first tape traveling speed ST1, and the traveling speed information signal is recorded in the magnetic tape T with the digital recording signals.

Figure 18:
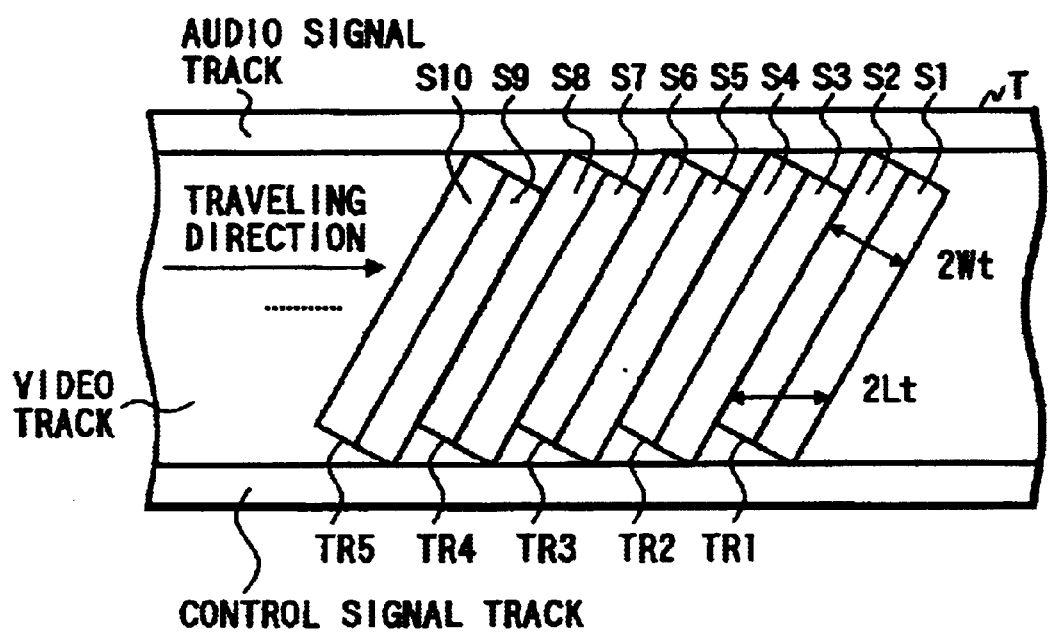
FIG. 18 shows a series of sets of tracks formed on the magnetic tape by recording the blocks of digital recording signals of which the timing chart is shown in FIG. 17.

In this case, when the rotational drum 44 is rotated by one rotation, the first and third rotational heads 65a and 65c having the different azimuth angles trace the magnetic tape T in the tracing direction in the first or latter half rotation of the rotational drum 44 to form a first set of tracks having a double track width 2*Wt (refer to FIG. 18). Thereafter, when the rotational drum 44 is again rotated by one rotation, the first and third rotational heads 65a and 65c trace the magnetic tape T in the tracing direction in the first or latter half rotation of the rotational drum 44 to form a second set of tracks having the same double track width 2*Wt (refer to FIG. 18). In this case, the first tape traveling speed ST1 is set to form the first set of tracks and the second set of tracks adjacent to each other on the magnetic tape T.

Recording of blocks of digital recording signals processed in the signal recording system 62 according to the first operation of the third embodiment is described with reference to FIGS. 17 and 18.

Figure 17:
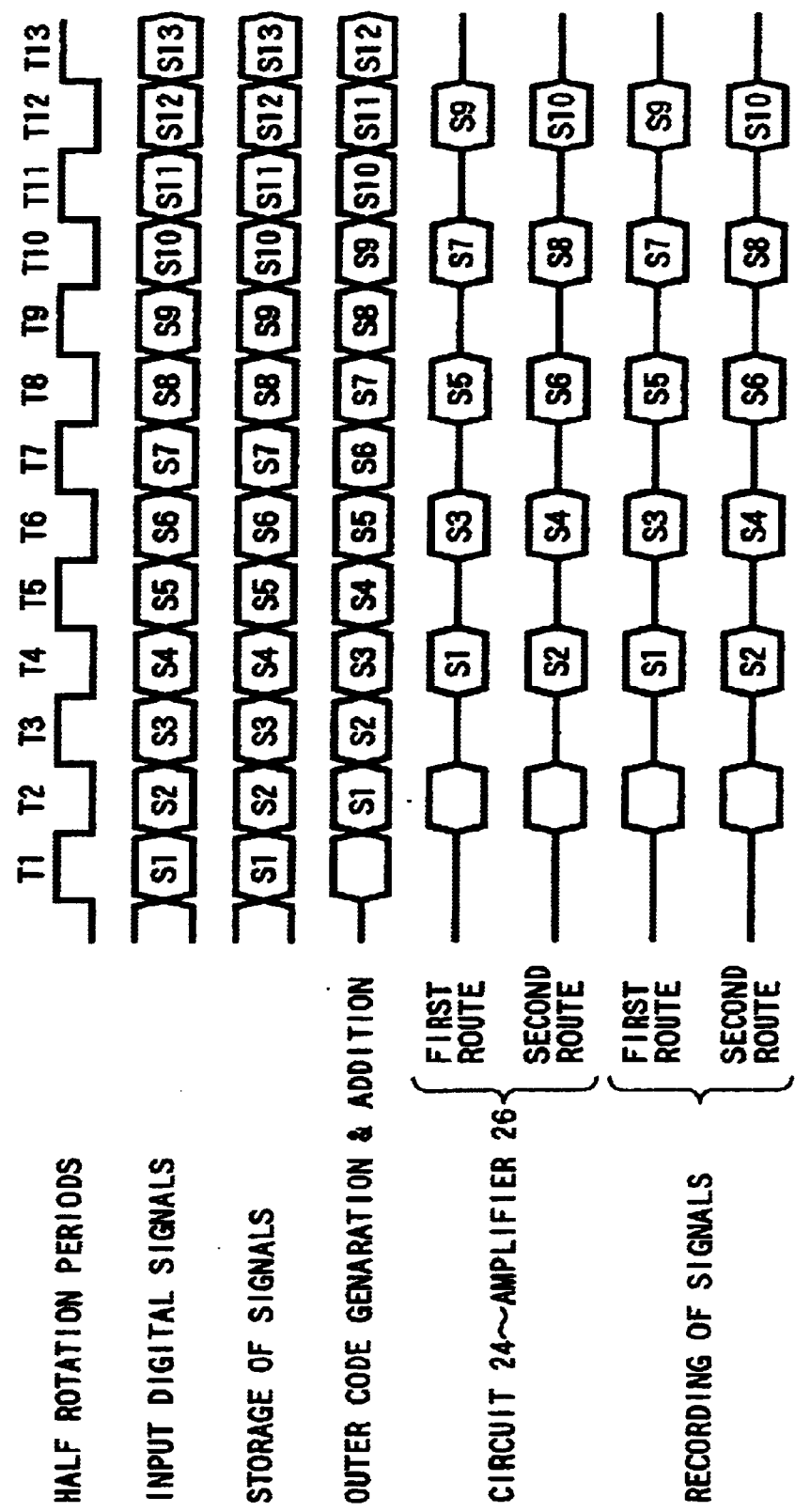
FIG. 17 is a timing chart of a plurality of blocks of digital recording signals processed in a signal recording system according to a first operation of the third embodiment.

FIG. 17 is a timing chart of a plurality of blocks of digital recording signals processed in the signal recording system 62 according to the first operation of the third embodiment. FIG. 18 shows a series of sets of tracks formed on the magnetic tape T by recording the blocks of digital recording signals of which the timing chart is shown in FIG. 17.

As shown in FIG. 17, a first block of digital signals S1 processed in the input interface 21 is stored in the first memory of the memory unit 64 in a first half-rotation period T1 of the rotational drum 44 in synchronization with the rotation of the rotational drum 44. Thereafter, an outer code is generated for the first block of digital signals S1 in the outer code generating circuit 23 and is supplied to the first memory of the storing unit 64 in a second half-rotation period T2. Also, a second block of digital signals S2 processed in the input interface 21 is stored in the second memory of the memory unit 64 in the second half-rotation period T2 because the input digital signals Sin are transmitted at the standard data rate A.

Thereafter, an outer code is generated for the second block of digital signals S2 in the outer code generating circuit 23 and is supplied to the second memory of the storing unit 64 in a third half-rotation period T3. Also, a third block of digital signals S3 processed in the input interface 21 is stored in the third memory of the memory unit 64 in the third half-rotation period T3.

Thereafter, in a fourth half-rotation period T4, the first block of digital signals S1 is processed in the first route recording system 57a and the second block of digital signals S2 is processed in the second route recording system 57b. The first block of digital signals S1 modulated and amplified is recorded on the magnetic tape T through the first rotational head 65a and the second block of digital signals S2 modulated and amplified is recorded on the magnetic tape T through the third rotational head 65c. Therefore, a first set of tracks TR1 is formed on the magnetic tape T. Also, an outer code generated for the third block of digital signals S3 in the outer code generating circuit 23 is supplied to the third memory of the storing unit 64, and a fourth block of digital signals S4 processed in the input interface 21 is stored in the fourth memory of the memory unit 64.

Thereafter, in a fifth half-rotation period T5, an outer code generated for the fourth block of digital signals S4 in the outer code generating circuit 23 is supplied to the fourth memory of the storing unit 64, and a fifth block of digital signals S5 processed in the input interface 21 is stored in the first memory of the memory unit 64.

Thereafter, in a sixth half-rotation period T6, the third block of digital signals S3 is processed in the first route recording system 57a and the fourth block of digital signals S4 is processed in the second route recording system 57b. The third block of digital signals S3 modulated and amplified is recorded on the magnetic tape T through the first rotational head 65a and the fourth block of digital signals S4 modulated and amplified is recorded on the magnetic tape T through the third rotational head 65c. Therefore, a second set of tracks TR2 is formed on the magnetic tape T.

In this case, because the magnetic tape T travels by the double traveling length 2*Lt corresponding to the double track width 2*Wt each time the rotational drum 44 is rotated by one rotation, the second set of tracks TR2 is adjacent to the first set of tracks TR1. Therefore, as shown in FIG. 18, a series of sets of tracks TRi (i is a natural number) can be formed on the magnetic tape T.

In a reproduction operation, the traveling speed information signal recorded is read out from the magnetic tape T in the signal reproducing system 53 and is transmitted to the change-over switches 66a and 66b through the control unit 39 to select the first and third rotational heads 65a and 65c. Also, the second tape driving control signal is transmitted from the control unit 39 to the tape driving unit 40 to drive the magnetic tape T at the same traveling speed as that at which the digital recording signals are recorded. Thereafter, odd-numbered blocks of digital signals recorded in the first tracks of sets of tracks TRi of the magnetic tape T are read out through the first rotational head 65a and are reproduced in the signal reproducing system 53 as the output digital signals Sout, and even-numbered blocks of digital signals recorded in the latter tracks of sets of tracks TRi of the magnetic tape T are read out through the third rotational head 65c and are reproduced in the signal reproducing system 53 as the output digital signals Sout.

Next, a second operation that the input digital signals Sin transmitted at a second data rate 2*A (Mbits per second) are recorded while traveling the magnetic tape T at the second tape traveling speed ST2=2*ST1 corresponding to the second data rate 2*A is described according to the third embodiment. In this case, the rotational drum 44 is set to the same fixed rotational speed as that in the first operation of the third embodiment.

First, the user inputs a traveling speed to the input unit 38 to designate the second tape traveling speed ST2. Thereafter, a traveling speed information signal indicating the second tape traveling speed ST2 is generated in the control unit 39 and is transmitted to the rotational head change-over switches 66a and 66b. Therefore, a group of the first and third rotational heads 65*a* and 65*c* having the different azimuth angles and another group of the second and fourth rotational heads 65*b* and 65*d* having the different azimuth angles are alternately selected in the change-over switches 66*a* and 66*b* each time the rotational drum 44 is rotated by half of rotation. Also, a first tape driving control signal is transmitted to the tape driving unit 40, and the traveling speed information signal is transmitted to the formatters 25*a* and 25*b*. Therefore, the magnetic tape T is moved at the first tape traveling speed ST1, and the traveling speed information signal is recorded in the magnetic tape T with the digital recording signals.

First, the user inputs a traveling speed to the input unit 38 to designate the second tape traveling speed ST2. Thereafter, a traveling speed information signal indicating the second tape traveling speed ST2 is generated in the control unit 39 and is transmitted to the tape driving unit 40 and the formatters 25*a* and 25*b*. Therefore, the magnetic tape T is moved at the second tape traveling speed ST2, and the traveling speed information signal is recorded on the magnetic tape T with the digital recording signals.

Recording of blocks of digital recording signals processed in the signal recording system 62 according to the second operation is described with reference to FIGS. 19 and 20.

Figure 19:
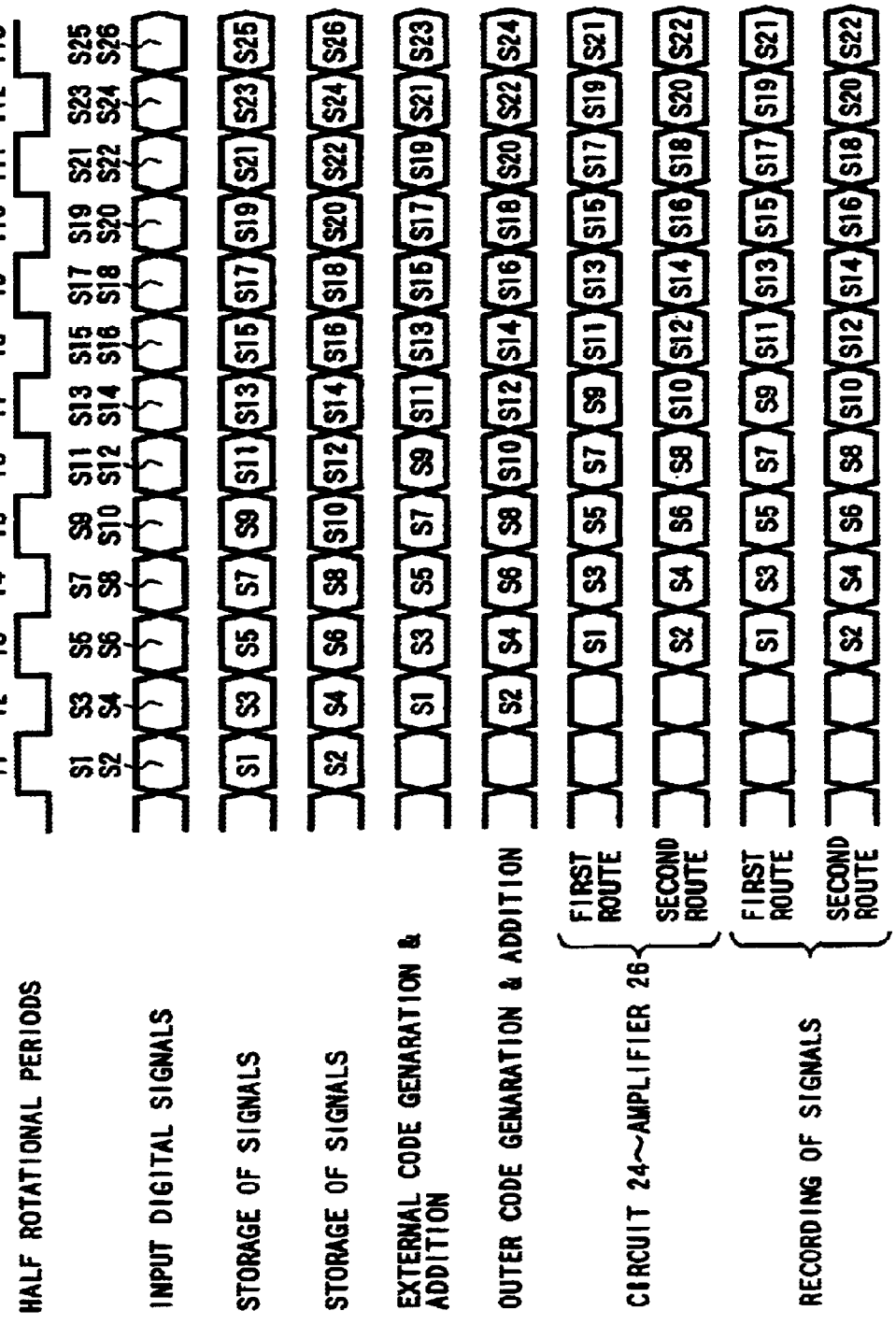
FIG. 19 is a timing chart of a plurality of blocks of digital recording signals processed in the signal recording system according to a second operation of the third embodiment.
Figure 20:
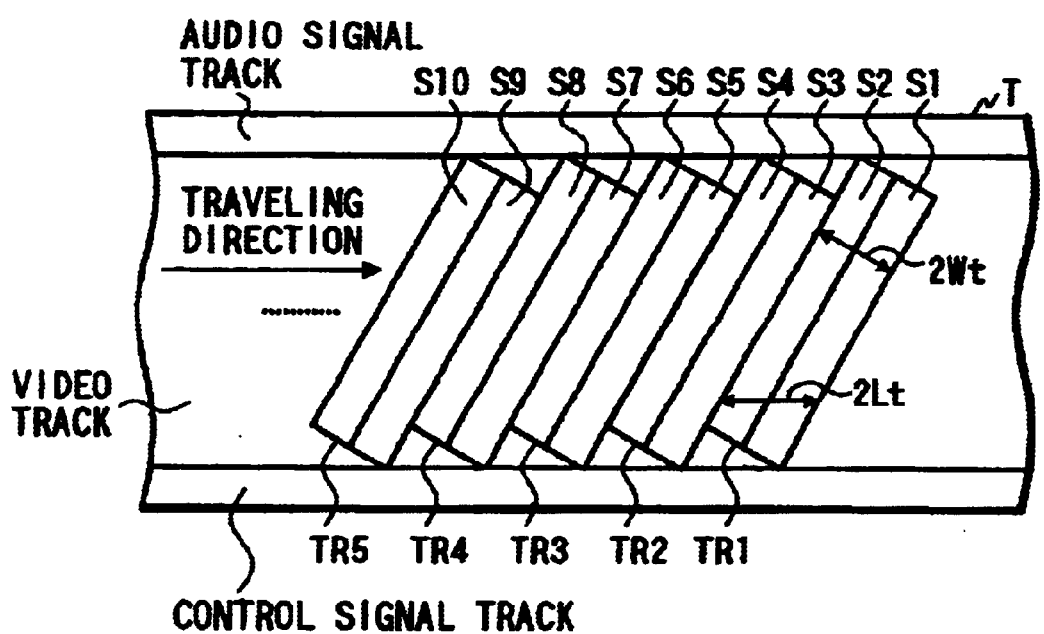
FIG. 20 shows a series of sets of tracks formed on the magnetic tape by recording the blocks of digital recording signals of which the timing chart is shown in FIG. 19.

FIG. 19 is a timing chart of a plurality of blocks of digital recording signals processed in the signal recording system 62 according to the second operation of the third embodiment. FIG. 20 shows a series of sets of tracks formed on the magnetic tape T by recording the blocks of digital recording signals of which the timing chart is shown in FIG. 19.

As shown in FIG. 19, a first block of digital signals S1 processed in the input interface 21 is stored in the first memory of the memory unit 55 in a first half-rotation period T1 of the rotational drum 44 in synchronization with the rotation of the rotational drum 44. Also, a second block of digital signals S2 processed in the input interface 21 is stored in the fourth memory of the memory unit 55 in the first half-rotation period Ti. Because the input digital signals Sin are transmitted at the second data rate 2*A, two blocks of digital signals are input to the apparatus 61 in a half-rotation period.

Thereafter, in a second half-rotation period T2, an outer code is generated for the first block of digital signals S1 in the outer code generating circuit 23 and is supplied to the first memory of the storing unit 55. Also, an outer code is generated for the second block of digital signals S2 in the outer code generating circuit 23 and is supplied to the fourth memory of the storing unit 55. Also, a third block of digital signals S3 processed in the input interface 21 is stored in the second memory of the memory unit 55, and a fourth block of digital signals S4 processed in the input interface 21 is stored in the fifth memory of the memory unit 55.

Thereafter, in a third half-rotation period T3, the first block of digital signals S1 is processed in the first route recording system 57*a* and the second block of digital signals S2 is processed in the second route recording system 57*b*. The first block of digital signals S1 modulated and amplified is recorded on the magnetic tape T through the first rotational head 65*a* and the second block of digital signals S2 modulated and amplified is recorded on the magnetic tape T through the third rotational head 65*c*. Therefore, a first set of tracks TR1 is formed on the magnetic tape T.

Also, in the third half-rotation period T3, an outer code is generated for the third block of digital signals S3 in the outer code generating circuit 23 and is supplied to the second memory of the storing unit 55. Also, an outer code is generated for the fourth block of digital signals S4 in the outer code generating circuit 23 and is supplied to the fifth memory of the storing unit 55. Also, a fifth block of digital signals S5 processed in the input interface 21 is stored in the third memory of the memory unit 55, and a sixth block of digital signals S6 processed in the input interface 21 is stored in the sixth memory of the memory unit 55.

Thereafter, in a fourth half-rotation period T4, the third block of digital signals S3 is processed in the first route recording system 57*a* and the fourth block of digital signals S4 is processed in the second route recording system 57*b*. The third block of digital signals S3 modulated and amplified is recorded on the magnetic tape T through the second rotational head 65*b* and the fourth block of digital signals S4 modulated and amplified is recorded on the magnetic tape T through the fourth rotational head 65*d*. Therefore, a second set of tracks TR2 is formed on the magnetic tape T.

In this case, because the magnetic tape T travels by the double traveling length 2*Lt corresponding to the double track width 2*Wt each time the rotational drum 44 is rotated by half of rotation, the second set of tracks TR2 is adjacent to the first set of tracks TR1.

Figure 14:
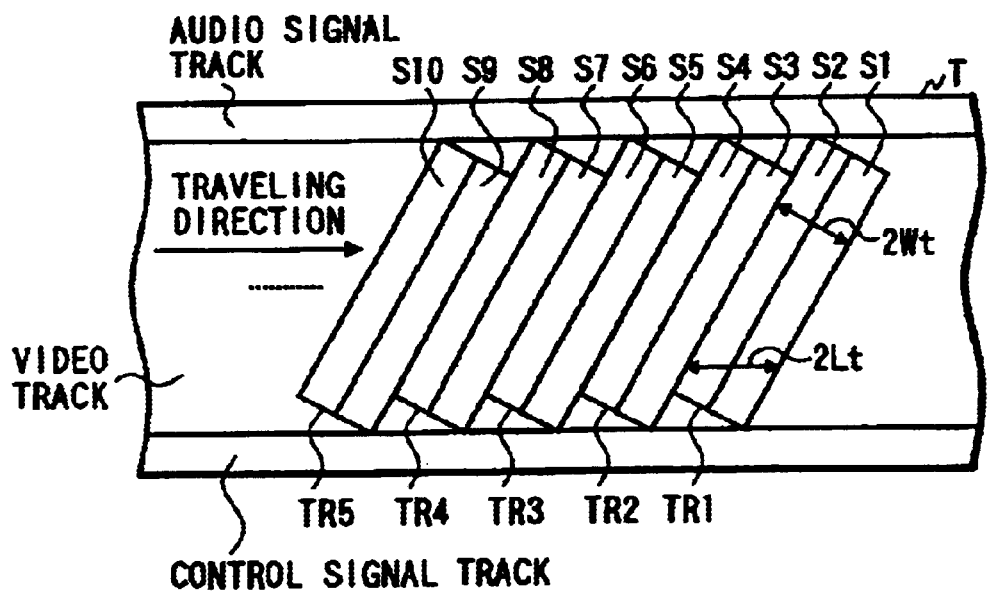
FIG. 14 shows a series of sets of tracks formed on the magnetic tape by recording the blocks of digital recording signals of which the timing chart is shown in FIG. 13.

Therefore, as shown in FIG. 14, alternate rows of the odd-numbered sets of tracks TRi (i is an odd number) corresponding to the first rotational head 65*a* of the first azimuth angle and the even-numbered sets of tracks TRj (j is an even number) corresponding to the second rotational head 65*b* of the second azimuth angle can be formed on the magnetic tape T.

In a reproduction operation, the traveling speed information signal recorded is read out from the magnetic tape T in the signal reproducing system 53 and is transmitted to the change-over switches 66*a* and 66*b* through the control unit 39 to alternately select a group of the first and third rotational heads 65*a* and 65*c* and another group of the second and fourth rotational heads 65*b* and 65*d* in a half rotation cycle. Also, the second tape driving control signal is transmitted from the control unit 39 to the tape driving unit 40 to move the magnetic tape T at the same traveling speed as that at which the digital recording signals are recorded. Thereafter, first odd-numbered blocks of digital signals recorded in the first tracks of odd-numbered sets of tracks TRi of the magnetic tape T are read out through the first rotational head 65*a* and are reproduced in the signal reproducing system 53 as the output digital signals Sout, and first even-numbered blocks of digital signals recorded in the latter tracks of the odd-numbered sets of tracks TRi are read out through the third rotational head 65*c* and are reproduced in the signal reproducing system 53 as the output digital signals Sout. Also, second odd-numbered blocks of digital signals recorded in the first tracks of even-numbered sets of tracks TRi of the magnetic tape T are read out through the second rotational head 65*b* and are reproduced in the signal reproducing system 53 as the output digital signals Sout, and second even-numbered blocks of digital signals recorded in the latter tracks of the even-numbered sets of tracks TRi are read out through the fourth rotational head 65*d* and are reproduced in the signal reproducing system 53 as the output digital signals Sout.

In the second operation of the second embodiment, the input digital signals Sin transmitted at a second data rate 2*A twice as high as the standard data rate A are representatively recorded and reproduced in the magnetic recording and reproducing apparatus 61. Generally, in cases where the input digital signals Sin transmitted at the standard data rate A or a second data rate N*A are processed, when the input digital signals Sin transmitted at the standard data rate A is input, a pair of blocks of digital recording signals are simultaneously provided to the first and third rotational heads 65a and 65c for each period of N/2 rotations of the rotational drum 44 and are simultaneously recorded on the magnetic tape T, and a pair of blocks of digital recording signals recorded are simultaneously read through the first and third rotational heads 65a and 65c for each period of N/2 rotations of the rotational drum 44 and are reproduced. When the input digital signals Sin transmitted at the second data rate N*A is input, a group of first and third rotational heads 65a and 65c and another group of the second and fourth rotational heads 65b and 65d are alternately selected for each half rotation of the rotational drum 44, and a pair of digital recording signals are recorded on the magnetic tape T for each half rotation of the rotational drum 44.

Also, in the third embodiment, the digital signals transmitted at a data rate A/(2N) (N is a natural number) can be recorded and reproduced in the magnetic recording and reproducing apparatus 61 in the same manner as in the second operation of the first embodiment or the second operation of the second embodiment by selecting a group of the first and third rotational heads 65a and 65c or another group of the second and fourth rotational heads 65b and 65d in the change-over switches 66a and 66b. Also, the digital signals transmitted at a data rate A/(2N+1) can be recorded and reproduced in the magnetic recording and reproducing apparatus 61 in the same manner as in the third operation of the first embodiment by selecting a group of the first and fourth rotational heads 65a and 65d or another group of the second and third rotational heads 65b and 65c in the change-over switches 66a and 66b. Also, the digital signals transmitted at a data rate A/(2N+1) can be recorded and reproduced in the magnetic recording and reproducing apparatus 61 in the same manner as in the second operation of the second embodiment by selecting a group of the first and third rotational heads 65a and 65c or another group of the second and fourth rotational heads 65b and 65d in the change-over switches 66a and 66b.

Also, in the third embodiment, though the digital signals transmitted at the second data rate 2*A which is twice as high as the standard data rate A are recorded and reproduced in the magnetic recording and reproducing apparatus 61, digital signals transmitted at an arbitrary data rate N*A which is N times as high as the standard data rate A can be recorded and reproduced in the apparatus 61. That is, in cases where the rotation speed of the rotational drum 44 is adjusted to record two blocks of input digital signals Sin transmitted at the standard data rate A through the rotational heads 65a and 65c each time the rotational drum 44 is rotated by N rotations, input data signals transmitted at a first arbitrary data rate 2N*A can be recorded by recording two blocks of the input digital signals Sin while alternately selecting a group of the rotational heads 65a and 65c and another group of the rotational heads 65b and 65d each time the rotational drum 44 is rotated by a half rotation. Also, in cases where the rotation speed of the rotational drum 44 is adjusted to record two blocks of input digital signals Sin transmitted at the standard data rate A while alternately selecting a group of the rotational heads 65a and 65c and another group of the rotational heads 65b and 65d each time the rotational drum 44 is rotated by N rotations and a half, input data signals transmitted at a second arbitrary data rate (2N+1)*A can be recorded by recording two blocks of the input digital signals Sin while selecting a group of the rotational heads 65a and 65c and another group of the rotational heads 65b and 65d each time the rotational drum 44 is rotated by a half rotation. Accordingly, even though the data rate of the input digital signals Sin input to the magnetic recording and reproducing apparatus 61 is changed to 1/N (N is a natural number) the standard data rate or N times the standard data rate, in cases where the traveling speed of the magnetic tape T is changed to 1/N the standard traveling speed ST1 or N times the standard traveling speed ST1, the input digital signals Sin can be efficiently and reliably recorded on the magnetic tape T.

Also, because a traveling speed information signal indicating a traveling speed of the magnetic tape T which corresponds to the data rate of the input digital signals Sin is recorded on the magnetic tape T with the input digital signals Sin regardless of the data rate of the input digital signals Sin, the digital recording signals recorded in the magnetic tape T can be read out at the same traveling speed of the magnetic tape T as that at which the digital recording signals are written in the magnetic tape T, and the output digital signals Sout which are the same as the input digital signals Sin can be reproduced.

Also, in the first to third embodiments, even though the data rate of the input digital signals Sin is equal to 1/N the standard data rate A in the second or third operation, because a traveling speed of the magnetic tape T is reduced to 1/N as compared with that in the first operation and the tracks formed on the magnetic tape T are adjacent to each other, a data recording density on the magnetic tape T is the same as that in the first operation. Therefore, the input digital signals Sin can be recorded on the magnetic tape T at the same data recording density regardless of the data rate of the input digital signals Sin, and a data recording time of the magnetic tape T can be prolonged N times as much as that in the first operation.

Also, in the first to third embodiments, the rotational speed of the rotational drum 44 and the traveling speed of the magnetic tape T in the recording operation are the same as those in the reproducing operation, the configuration of the signal reproducing system 13 can be simplified.

Also, in the first to third embodiments, the rotational speed of the rotational drum 44 is fixed regardless of the data rate of the input digital signals Sin or whether the recording operation or the reproducing operation is performed, an adverse influence of an air film formed between the rotational drum 44 and the magnetic tape T when the rotational speed of the rotational drum 44 is changed can be reduced.

Also, in the first to third embodiments, because magnetic inverting distances in the recording operation are the same as those in the reproducing operation, reproduced waveforms of the digital recording signals are the same as those of the digital recording signals. Therefore, it is not required to perform a troublesome operation such as an adjustment of the reproduced waveforms of the digital recording signals.

The processing performed in the outer code generating circuit 23 and the inner code generating circuit 24, 24a or 24b is not limited to the first to third embodiments. For example, when one rotational head accurately scans a track on the magnetic tape T, it is applicable that a signal indicating the finish of an inner error correction and an outer error correction be written in the memory unit 22 or 64 for each block of digital signals. Also, regardless of whether one rotational head accurately scans a track on the magnetic tape T, it is applicable that a signal indicating the finish of an inner error correction be written in the memory unit 22 or 64 for each block of digital signals and an outer error correction be performed each time a group of digital signals corresponding to one rotation period is written in the memory unit 22 or 64.

Also, a control signal is sometimes recorded and reproduced in/from an arbitrary track of the magnetic tape T such as a control track to accurately scan the tracks formed on the magnetic tape T. In this case, it is applicable that an intensity of the control signal be made variable to distinguish a recording track in which a signal is really recorded from a non-recording track in which any signal is not recorded. For example, a first control signal having a first signal waveform or a first duty ratio is recorded on the magnetic tape T when the recording track is formed, and a second control signal having a second signal waveform or a second duty ratio is recorded on the magnetic tape T when the non-recording track is formed. Therefore, in cases where a track formed on the magnetic tape T is scanned only when the first control signal is detected, only the recording tracks can be efficiently scanned to reproduce signals. Also, it is applicable that control signals respectively indicating a traveling time of the magnetic tape be recorded on the magnetic tape T to detect a traveling time or a remaining volume of the magnetic tape T.

Next, a fourth embodiment is described.

Figure 21:
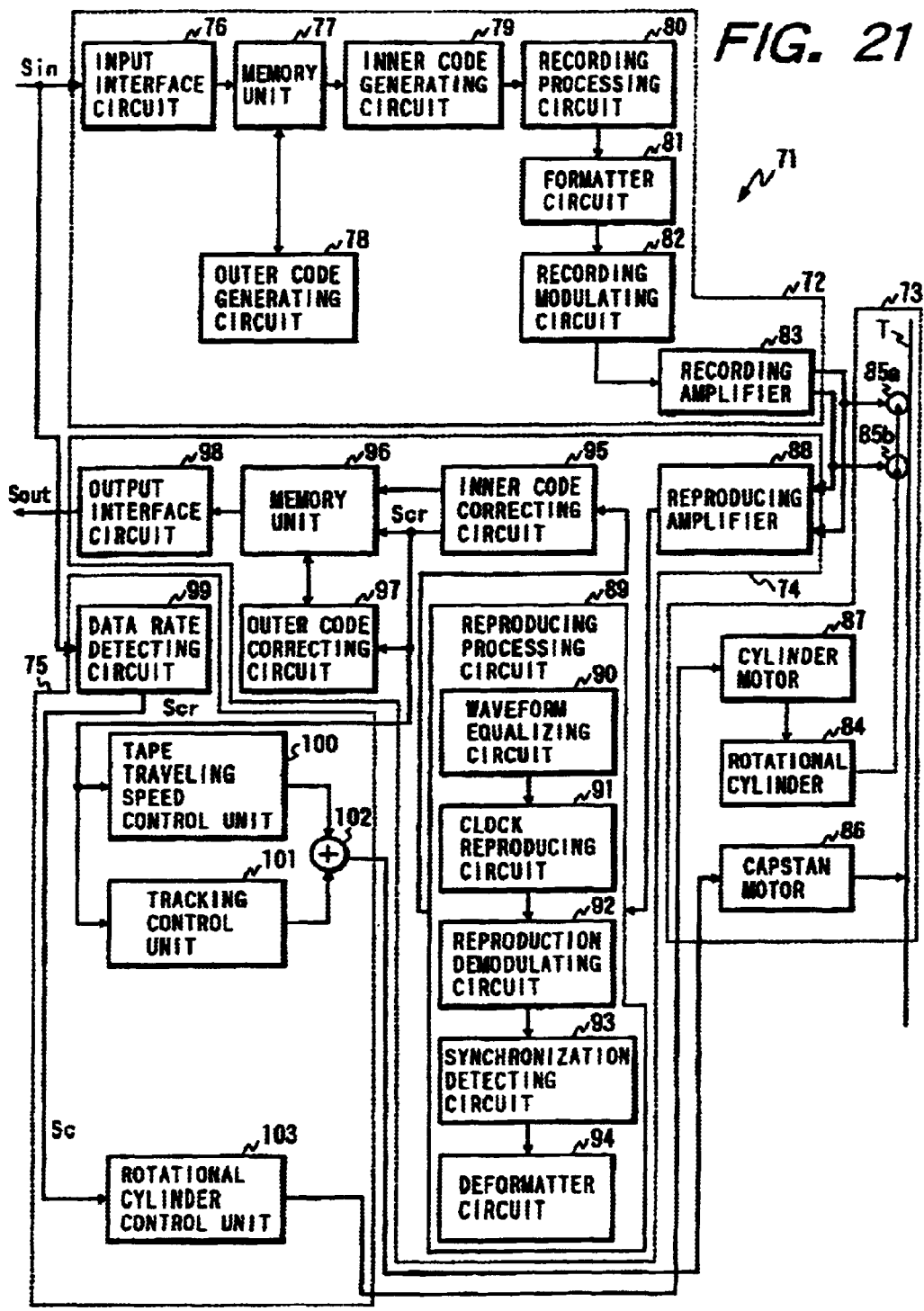
FIG. 21 is a block diagram of a magnetic recording and reproducing apparatus according to a fourth embodiment of the present invention.

FIG. 21 is a block diagram of a magnetic recording and reproducing apparatus according to a fourth embodiment of the present invention.

As shown in FIG. 21, a magnetic recording and reproducing apparatus 71 comprises an input signal processing system 72 for processing a plurality of input digital signals Sin transmitted at a prescribed data rate through a transmission line (not shown) to generate a plurality of digital recording signals, a recording and reading system 73 for recording and reading the digital recording signals generated in the input signal processing system 72 on/from a magnetic recording medium T such as a magnetic tape while forming a plurality of patterned tracks on the magnetic recording medium T, a signal reproducing system 74 for reproducing the digital recording signals read in the recording and reading system 73, and a control system 75 for controlling the recording and reading system 73 and the traveling speed of the magnetic tape T.

The input signal processing system 72 comprises an input interface circuit 76 for receiving a plurality of input digital information signals Sin transmitted at a standard data rate A or a second data rate equal to 1/N (N is a natural number) the standard data rate A and converting the information signals Sin into a plurality of digital recording signals, a memory unit 77 for storing blocks of the digital recording signals, which each corresponds to a track formed on the magnetic tape T and are transferred from the input interface circuit 76, one by one, an outer code generating circuit 78 for generating an outer error correcting code and adding the outer error correcting code to each block of digital recording signals stored in the storing unit 77, an inner code generating circuit 79 for generating an inner error correcting code and adding the inner error correcting code to each block of digital recording signals transferred from the storing unit 77, a recording processing circuit 80 having a formatter circuit 81 and a recording modulating circuit 82 for adding a synchronization signal and an identification signal to each block of digital recording signals transferred from the inner code generating circuit 79, changing an original arrangement of the digital recording signals in each block to a recording arrangement in a prescribed recording order in the formatter circuit 81, performing a record modulation such as an extended frequency modulation (EFM) or the like for each block of digital recording signals in the recording modulating circuit 82, and a recording amplifier 83 for amplifying the digital recording signals processed in the recording processing circuit 80 to a prescribed recording level.

Figure 22:
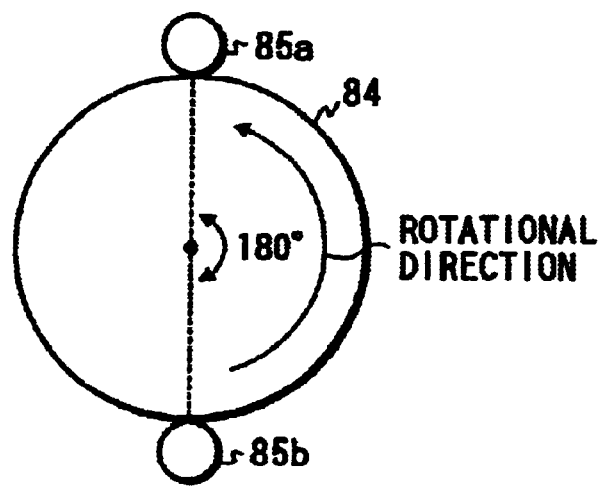
FIG. 22 shows the arrangement of first and second rotational heads placed on a rotational cylinder according to the fourth embodiment.

FIG. 22 shows the arrangement of rotational heads placed on a rotational cylinder according to the fourth embodiment.

As shown in FIGS. 21 and 22, the recording and reading system 73 comprises a rotational cylinder 84 rotated at a changeable cycle, a first rotational head 85a of a first azimuth angle and a second rotational head 85b of a second azimuth angle arranged on the rotational cylinder 84 on condition that the rotational heads 85a and 85b are spaced at 180 degrees apart from each other, a capstan motor 86 for moving the magnetic tape T at a changeable traveling speed, and a cylinder motor 87 for rotating the first rotational head 85a at the changeable cycle.

The blocks of digital recording signals processed in the input signal processing system 72 are alternately provided to the first and second rotational heads 85a and 85b, and each block of digital recording signals is recorded on the magnetic tape T through the first or second rotational head 85a or 85b each time the rotational cylinder 84 is rotated by a half rotation. As a result, alternate rows of first azimuth tracks formed by recording blocks of digital recording signals through the first rotational head 85a and second azimuth tracks formed by recording blocks of digital recording signals through the second rotational head 85b are formed on the magnetic tape T. In this case, assuming that the first and second rotational heads 85a and 85b have the same azimuth angle, a crosstalk between a pair of tracks adjacent to each other on the magnetic tape T occurs. Therefore, the first and second rotational heads 85a and 85b have different azimuth angles.

The signal reproducing system 74 comprises
  a reproducing amplifier 88 for amplifying the blocks of digital recording signals read from the magnetic tape T through the first and second rotational heads 85a and 85b to a prescribed reproducing level,
  a reproduction processing circuit 89 having a waveform equalizing circuit 90, a clock reproducing circuit 91, a reproduction demodulating circuit 92, a synchronization detecting circuit 93 and a deformatter circuit 94 for equalizing waveforms of each block of digital recording signals processed in the reproducing amplifier 88 in the waveform equalizing circuit 90, generating clock signals used as a standard clock in bit (or byte) unit according to each block of digital recording signals in the clock reproducing circuit 91, demodulating each block of digital recording signals in the reproduction demodulating circuit 92 having a complementary relationship with the recording modulating circuit 82, detecting the synchronization signal added in the formatter circuit 81 for each block of digital recording signals in the synchronization detecting circuit 93 to detect a starting point of each block of digital recording signals, and rearranging the recording arrangement of the digital recording signals in each block to the original arrangement in the deformatter circuit 94 having a complementary relationship with the formatter circuit 81,
  an inner code correcting circuit 95 for correcting each block of digital recording signals according to the inner error correcting code added in the inner code generating circuit 79,
  a memory unit 96 for storing each block of digital recording signals corrected in the inner code correcting circuit 95,
  an outer code correcting circuit 97 for correcting each block of digital recording signals stored in the storing unit 96 according to the outer error correcting code added in the outer code generating circuit 78, and an output interface circuit 98 for generating a plurality of digital information signals Sout from the blocks of digital recording signals stored in the storing unit 96.

Odd-numbered blocks of digital recording signals recorded on the magnetic tape T through the first rotational head 85a are read out through the first rotational head 85a and are processed in the signal reproducing system 74. Also, Even-numbered blocks of digital recording signals recorded on the magnetic tape T through the second rotational head 85b are read out through the second rotational head 85b and are processed in the signal reproducing system 74.

Also, in cases where an inversion cycle of the digital recording signals is equal to a prescribed value, waveforms of the digital recording signals are equalized in the waveform equalizing circuit 90.

The control system 75 comprises a data rate detecting circuit 99 for detecting a piece of data-rate information indicating a data rate of the input digital information signals Sin from the input digital information signals Sin and generating a control signal Sc indicating a data rate of the input digital information signals Sin, the data-rate information being recorded on the magnetic tape T through the input signal processing system 72, a tape traveling speed control unit 100 for generating a traveling speed signal indicating a first traveling speed of the magnetic tape T in a recording operation in cases where the control signal Sc indicates the standard data rate, generating a traveling speed signal indicating a second traveling speed equal to 1/N the first traveling speed in the recording operation in cases where the control signal Sc indicates the second data rate, generating a traveling speed signal indicating the first traveling speed in a reproducing operation in cases where a reproduced control signal Scr obtained by reproducing the data-rate information recorded on the magnetic tape T in the signal reproducing system 74 indicates the standard data rate, and generating a traveling speed signal indicating the second traveling speed in the reproducing operation in cases where the reproduced control signal Scr indicates the second data rate, a tracking control unit 101 for generating a prescribed tracking signal in the recording operation and generating a tracking signal in the reproducing operation according to the reproduced control signal Scr, an adder 102 for adding the traveling speed signal generated in the tape traveling speed control unit 100 and the tracking signal generated in the tracking control unit 101, the capstan motor 86 being operated according to the traveling speed signal and the tracking signal to move the magnetic tape T at the first or second traveling speed, and a rotational cylinder control unit 103 for generating a cylinder control signal indicating a first rotational speed of the rotational cylinder 84 in the recording operation in cases where the control signal Sc indicates the standard data rate and generating a cylinder control signal indicating a second rotational speed of the rotational cylinder 84 equal to 1/N the first rotational speed in the recording operation in cases where the control signal Sc indicates the second data rate, the cylinder motor 87 being operated according to the cylinder control signal to rotate the rotational cylinder 84 at the first or second rotational speed.

In the above configuration of the magnetic recording and reproducing apparatus 71, a recording operation of the fourth embodiment is described.

When a plurality of input digital information signals Sin including a piece of data-rate information is input to the apparatus 71 at the standard data rate A, the data-rate information is detected in the data rate detecting circuit 99, and a control signal Sc indicating the standard data rate A is transferred to the tape traveling speed control unit 100 and the rotational cylinder control unit 103. In the unit 100, a traveling speed signal indicating a first traveling speed is generated according to the control signal Sc, and the magnetic tape T is moved at the first traveling speed by operating the capstan motor 86 according to the traveling speed signal. Also, a cylinder control signal indicating a first rotational speed is generated in the unit 103 according to the control signal Sc, and the rotational cylinder 84 is rotated at the first rotational speed by operating the cylinder motor 87 according to the traveling speed signal.

Thereafter, the signals Sin including the data-rate information are processed in the input signal processing system 72, and a plurality of blocks of digital recording signals including the data-rate information are generated in the system 72. Thereafter, the blocks of digital recording signals are alternately provided to the first rotational head 85a and the second rotational head 85b for each first alternation period of a half rotation of the rotational cylinder 84 and are recorded on the magnetic tape T moved at the first traveling speed. That is, odd-numbered blocks of digital recording signals are recorded through the first rotational head 85a, and even-numbered blocks of digital recording signals are recorded through the second rotational head 85b.

Figure 23:
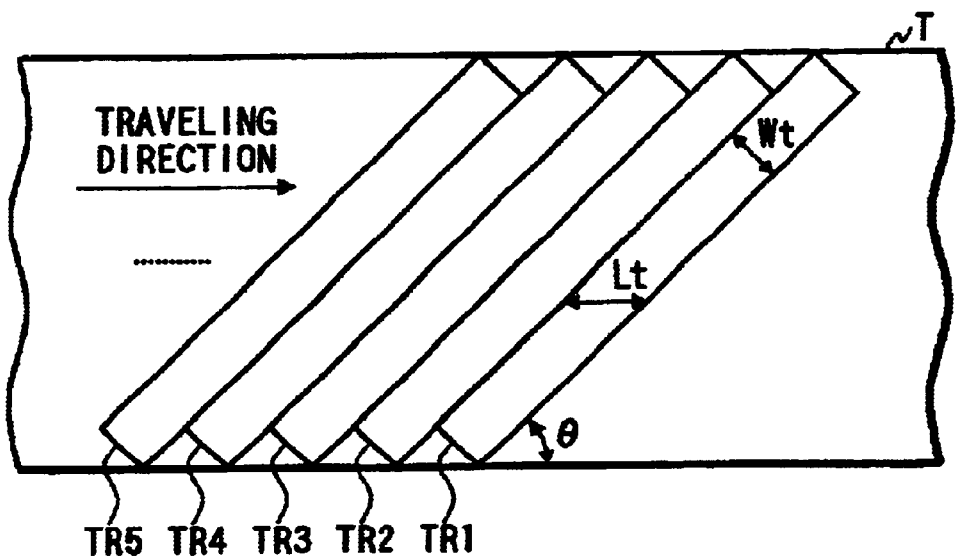
FIG. 23 shows a series of tracks formed on a magnetic tape by alternately recording blocks of digital recording signals through the first and second rotational heads when input digital information signals are transmitted at a standard data rate.

Therefore, as shown in FIG. 23, alternate rows of first azimuth tracks TRi (i is odd numbers) corresponding to the first rotational head 85a and second azimuth tracks TRi (j is even numbers) corresponding to the second rotational head 85b are formed on the magnetic tape T. In this case, because the magnetic tape T travels a traveling length Lt corresponding to a track width Wt for each half rotation of the rotational cylinder 84, the tracks are adjacent to each other. Also, the tracks are inclined at a track inclination angle θ with respect to a traveling direction of the magnetic tape T. The track inclination angle θ is determined by a first speed ratio of the first traveling speed to the first rotational speed. In addition, magnetic charges formed on the magnetic tape T are inverted at a minimum inversion interval. The minimum inversion interval is determined according to a recording density of digital recording signals recorded on the magnetic tape T. In other words, the minimum inversion interval corresponds to an inversion cycle of the digital recording signals and is determined according to a first density ratio of an amount of digital recording signals recorded on a track to a length of the track.

In contrast, when a plurality of input digital information signals Sin including a piece of data-rate information is input to the apparatus 71 at the second data rate A/N equal to 1/N of the standard data rate A, a control signal Sc indicating the second data rate A/N is transferred to the tape traveling speed control unit 100 and the rotational cylinder control unit 103. In the unit 100, a traveling speed signal indicating a second traveling speed equal to 1/N the first traveling speed is generated according to the control signal Sc, and the magnetic tape T is moved at the second traveling speed. Also, a cylinder control signal indicating a second rotational speed equal to 1/N the first rotational speed is generated in the unit 103 according to the control signal Sc, and the rotational cylinder 84 is rotated at the second rotational speed.

Thereafter, a plurality of blocks of digital recording signals including the data-rate information are generated in the system 72 in the same manner. Thereafter, the blocks of digital recording signals are alternately provided to the first rotational head 85a and the second rotational head 85b for each second alternation period of N/2 rotations of the rotational cylinder 84 and are recorded on the magnetic tape T moved at the second traveling speed.

Figure 24:
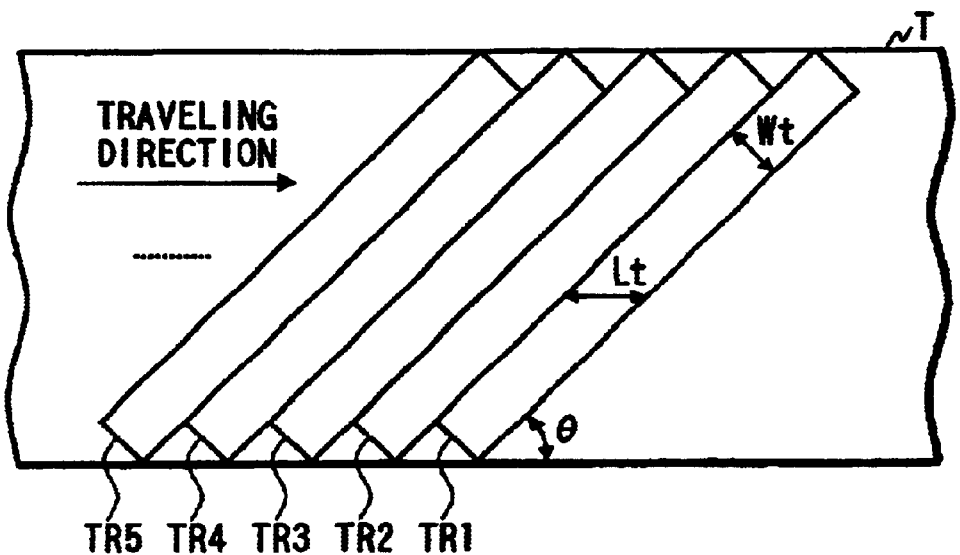
FIG. 24 shows a series of tracks formed on the magnetic tape by alternately recording the blocks of digital recording signals through the first and second rotational heads when input digital information signals are transmitted at a second data rate.

Therefore, as shown in FIG. 24, alternate rows of first azimuth tracks TRi corresponding to the first rotational head 85a and second azimuth tracks TRj corresponding to the second rotational head 85b are formed on the magnetic tape T in the same manner. In this case, because the magnetic tape T travels the traveling length Lt corresponding to the track width Wt for each N/2 rotations of the rotational cylinder 84, the tracks are adjacent to each other. Also, because a second speed ratio of the second traveling speed to the second rotational speed is the same as the first ratio, the tracks are inclined at the same track inclination angle θ.

In addition, because an amount of digital recording signals recorded for each track is the same as that in case of the standard data rate A and a track length is the same as that in case of the standard data rate A, a second density ratio of an amount of digital recording signals recorded on a track to a length of the track is the same as the first density ratio. Therefore, a minimum inversion interval in case of the second data rate A/N is the same as that in case of the standard data rate A.

Next, a reproducing operation of the fourth embodiment is described.

In a reproducing operation, the data-rate information recorded on the magnetic tape T is initially read out and is reproduced in the circuits 89 and 95 to generate a reproduced control signal Scr indicating the standard data rate or the second data rate. The reproduced control signal Scr is used in the circuit 95 and is supplied to the memory unit 96 and the outer code correcting circuit 97. In the units 95 and 96, a correction timing for the digital recording signals reproduced is specified according to the reproduced control signal Scr. In the unit 96, a write address for the digital recording signals reproduced is specified according to the reproduced control signal Scr. Also, the reproduced control signal Scr is supplied to the tape traveling speed control unit 100 and the tracking control unit 101. Therefore, in cases where the reproduced control signal Scr indicates the standard data rate, a traveling speed signal indicating the first traveling speed is generated in the unit 100. Also, in cases where the reproduced control signal Scr indicates the second data rate, a traveling speed signal indicating the second traveling speed is generated in the unit 100. Therefore, the magnetic tape T is moved at the first or second traveling speed. In the unit 101, a degree of tracking is determined according to the reproduced control signal Scr. That is, in cases where the reproduced control signal Scr indicates a data rate equal to 1/(2*N) the standard data rate, a tracking signal is generated to shift a tracking phase of the first and second rotational heads 85a and 85b by an angle of 180/(2*N) degrees at a reading start point of a track. Also, in cases where the reproduced control signal Scr indicates a data rate equal to 1/(2*N+1) the standard data rate, a tracking signal is generated not to shift a tracking phase at a reading start point of a track.

The reproduced control signal Scr is not supplied to the rotational cylinder control unit 103. In other words, regardless of whether the reproduced control signal Scr indicates the standard or second data rate, a cylinder control signal indicating the first rotational speed is generated in the unit 103, and the rotational cylinder 84 is always rotated at the first rotational speed in the reproducing operation.

In cases where the digital recording signals relating to the input digital information signals Sin transmitted at the standard data rate are read out from the magnetic tape T, the magnetic tape T is moved at the first traveling speed and the rotational cylinder 84 is rotated at the first rotational speed in the same manner as in the recording operation. Therefore, the first rotational head 85a accurately traces the first azimuth tracks TRi one after another, the second rotational head 85b accurately traces the second azimuth tracks TRj one after another, and the digital recording signals are reliably reproduced in the signal reproducing system 74 to output a plurality of digital information signals Sout.

Figure 25:
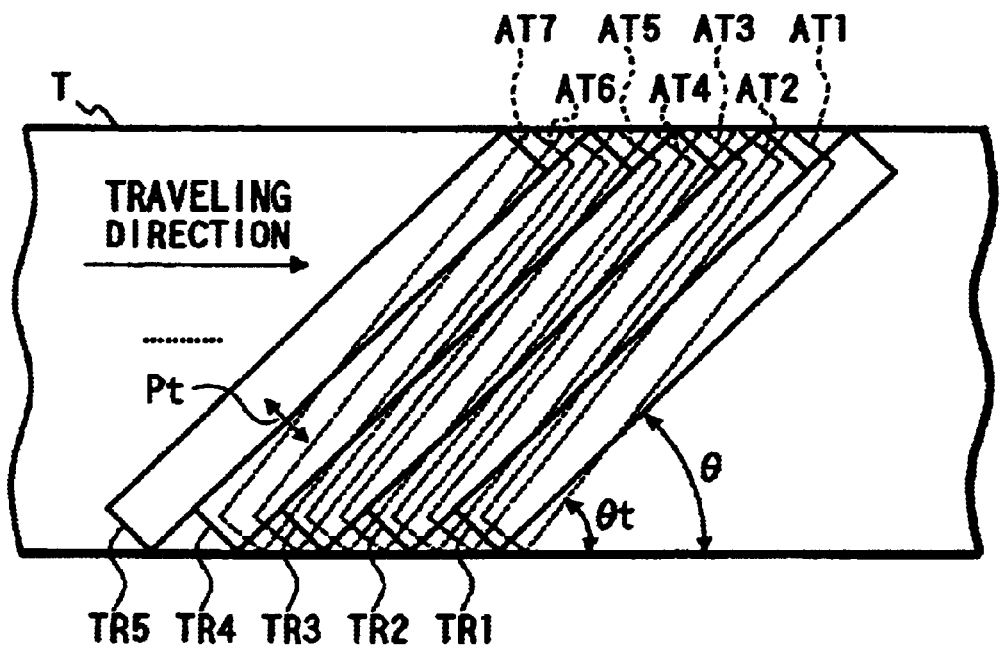
FIG. 25 shows tracing operations alternately performed by the first and second rotational heads for the tracks shown in FIG. 24, each tracing area being shown by a dotted rectangle on condition that a traveling speed of the magnetic tape is half of a first traveling speed and the rotational drum is rotated at a first rotational speed.

In contrast, in cases where the digital recording signals relating to the input digital information signals Sin transmitted at the second data rate are read out from the magnetic tape T, the magnetic tape T is moved at the second traveling speed in the same manner as in the recording operation, and the rotational cylinder 84 is rotated at the first rotational speed which is N times as high as the second rotational speed in the recording operation. In this case, as shown in FIG. 25, the rotational heads 85a and 85b trace in a track reading direction inclined by a track reading angle θt with respect to the traveling direction of the magnetic tape T. First tracing areas AT1 (i is odd numbers) traced by the first rotational head 85a and second tracing areas ATj (j is even numbers) traced by the second rotational head 85b are respectively shown by a rectangle drawn by a broken line. Because a tracing speed ratio of the second traveling speed to the first rotational speed is lower than the second speed ratio, the track reading angle θt is larger than the track inclination angle θ. Therefore, the rotational heads 85a and 85b trace on the magnetic tape T while crossing the tracks.

In this case, each of the first azimuth tracks TRi formed by recording odd-numbered blocks of digital recording signals through the first rotational head 85a is traced N times by the first rotational head 85a, and each odd-numbered blocks of digital recording signals are read out through the first rotational head 85a during a first tracing period in which a tracing operation of the first rotational head 85a is repeated N times. Also, each of the second azimuth tracks TRj formed by recording even-numbered blocks of digital recording signals through the second rotational head 85b is traced N times by the second rotational head 85b, and each even-numbered blocks of digital recording signals are read out through the second rotational head 85b during a second tracing period in which a tracing operation of the second rotational head 85b is repeated N times. Therefore, the digital recording signals can be reliably reproduced in the signal reproducing system 74 to output a plurality of digital information signals Sout.

In addition, in cases where the digital recording signals relating to the input digital information signals Sin transmitted at a data rate A/(2*N) are read through the rotational heads 85a and 85b, a tracking phase of each of the rotational heads 85a and 85b is shifted by an angle of 180/(2*N) degrees at a reading start point of each track. For example, in case of N=2 as shown in FIG. 25, a tracking phase is shifted by an angle of 45 degrees from a just tracking position. Therefore, a first positional condition of the first rotational head 85a for each first azimuth track TRi becomes the same as a second positional condition of the second rotational head 85b for each second azimuth track TRj, and a group of the odd-numbered blocks of digital recording signals and another group of even-numbered blocks of digital recording signals can be equally reproduced. In cases where the digital recording signals relating to the input digital information signals Sin transmitted at a data rate A/(2*N+1) are read through the rotational heads 85a and 85b, a group of the odd-numbered blocks of digital recording signals and another group of even-numbered blocks of digital recording signals can be equally reproduced without any shift of the tracking phase.

Also, in cases where the digital recording signals relating to the input digital information signals Sin transmitted at a data rate A/(2*N) are read through the rotational heads 85a and 85b, it is preferred that a head width of each of the rotational heads 85a and 85b be set to a value Tp*(1+1/(2*N)) wider than a track pitch Pt of the tracks. In this case, each of the tracks can be perfectly traced.

Thereafter, the digital recording signals read out are reproduced in the signal reproducing system 74 to generate a plurality of digital information signals Sout. In this case, because the minimum inversion interval of the magnetic charges on the magnetic tape T is constant regardless of the data rate of the input digital information signals Sin and because the digital recording signals recorded are read out by the rotational heads 85a and 85b tracing on the tracks at the first rotational speed regardless of whether the data rate of the input digital information signals Sin, an inversion cycle of the digital recording signals read out is constant regardless of whether the data rate of the input digital information signals Sin. Therefore, waveforms of the digital recording signals can be equalized in the waveform equalizing circuit 90.

Accordingly, even though the input digital information signals Sin transmitted at the standard data rate or the second data rate are input, because the rotational speed of the rotational cylinder 84 and the traveling speed of the magnetic tape T are changed in the same manner according to the data rate of the input digital information signals Sin, the tracks can be formed on the magnetic tape T in equal intervals regardless of the data rate of the input digital information signals Sin without any additional third rotational head.

Also, because the blocks of digital recording signals are alternately provided to the first and second rotational heads 85a and 85b having different azimuth angles to form a series of tracks on the magnetic tape T, azimuth angles of a pair of tracks adjacent to each other differ from each other. Therefore, crosstalk occurring in a pair of tracks adjacent to each other can be prevented, and the digital recording signals can be reproduced at a high quality.

Also, because the rotational speed of the rotational cylinder 84 is fixed to the first rotational speed in the reproducing operation regardless of the data rate of the input digital information signals Sin on condition that the minimum inversion interval of the magnetic charges on the magnetic tape T is fixed, an inversion cycle of the digital recording signals can be fixed to a prescribed value. Therefore, a plurality of waveform equalizing circuits respectively corresponding to a data rate of the input digital information signals Sin are not required. In other words, the configuration of the signal reproducing system 74 can be simplified.

Also, because a tracking phase is shifted by an angle of 180*(1/(2*N)) degrees at a reading start point of each track when the input digital information signals Sin are transmitted at the second data rate 1/(2*N), the odd-numbered blocks of digital recording signals read from the first azimuth tracks and the even-numbered blocks of digital recording signals read from the second azimuth tracks can be equally reproduced.

Also, because the data rate information is recorded on the magnetic tape T with the digital recording signals and the data rate information recorded is reproduced as the reproduced control signal in the signal reproducing system 74, a tape traveling speed can be automatically set in the reproducing operation.

In the fourth embodiment, the data-rate information included in the input digital information signals Sin is detected in the data rate detecting circuit 99. However, it is applicable that the data-rate information included in the digital recording signals which are obtained in one of the units and circuits 76 to 80 be detected in the data rate detecting circuit 99.

Next, a fifth embodiment is described.

Figure 26:
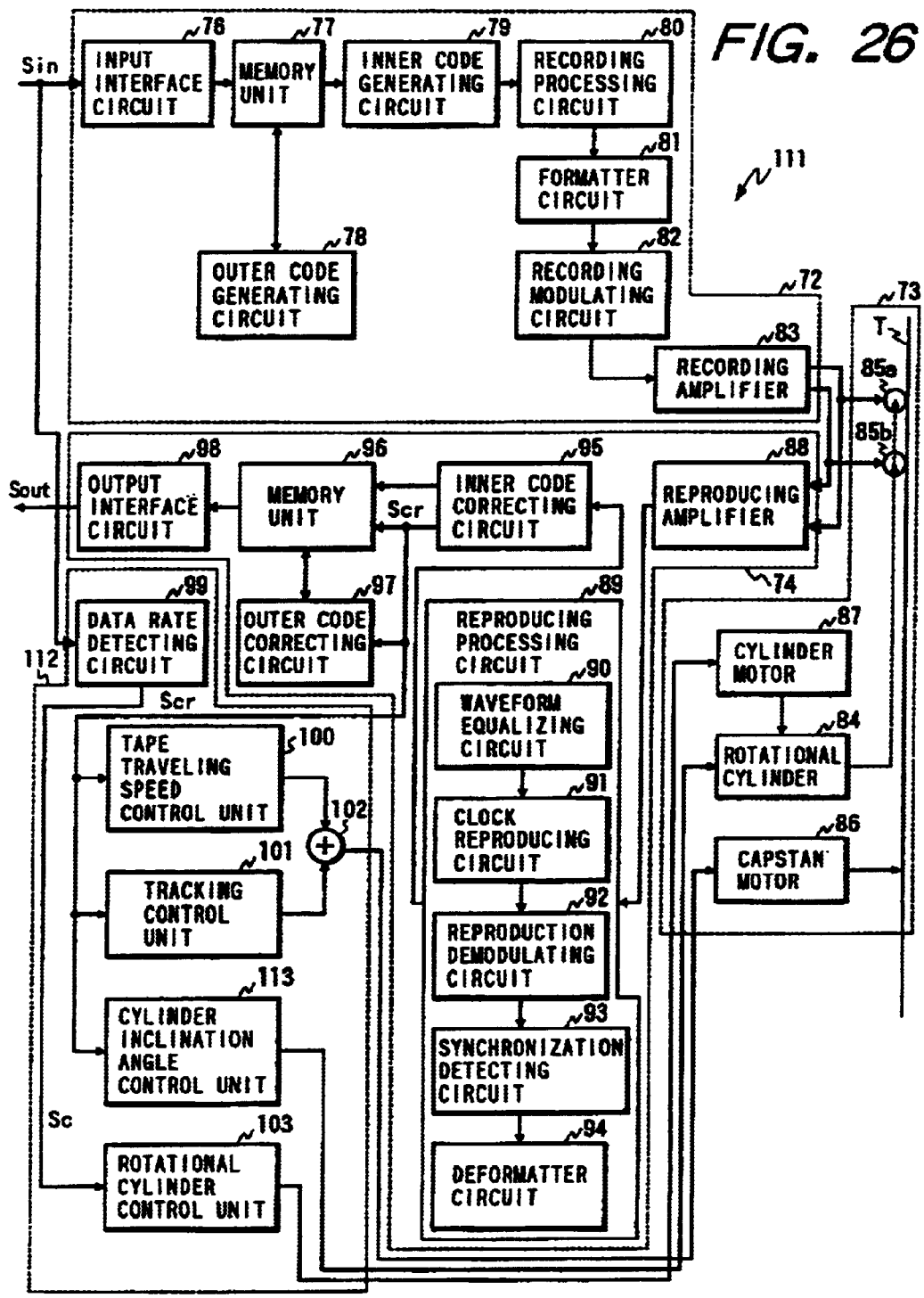
FIG. 26 is a block diagram of a magnetic recording and reproducing apparatus according to a fifth embodiment of the present invention.

FIG. 26 is a block diagram of a magnetic recording and reproducing apparatus according to a fifth embodiment of the present invention.

As shown in FIG. 26, a magnetic recording and reproducing apparatus 111 comprises the input signal processing system 72, the recording and reading system 73, the signal reproducing system 74, and a control system 112 for controlling the recording and reading system 73 and the traveling speed of the magnetic tape T.

The control system 112 comprises the data rate detecting circuit 99, the tape traveling speed control unit 100, the tracking control unit 101, the adder 102 for adding the traveling speed signal generated in the tape traveling speed control unit 100 and the tracking signal generated in the tracking control unit 101, the rotational cylinder control unit 103, and a cylinder inclination angle control unit 113 for controlling a cylinder inclination angle defined as an angle between the traveling direction of the magnetic tape T and a rotational direction of the rotational cylinder 84 to equalize a track reading angle of the rotational heads 85a and 85b with the track inclination angle θ of the tracks in cases where the reproduced control signal Scr indicates the second data rate A/N. The track reading angle is defined as an angle between a track reading direction of the rotational heads 85a and 85b with respect to the traveling direction of the magnetic tape T.

The cylinder inclination angle control unit 113 is constructed by an automatic scan tracking in which the rotational heads 85a and 85b are moved by a bimorph or is constructed by a well-known mechanism changing an attaching angle of the rotational cylinder 84.

In the above configuration of the magnetic recording and reproducing apparatus 111, a recording operation of the fifth embodiment is performed in the same manner as in the fourth embodiment. Also, in cases where the reproduced control signal Scr indicating the standard data rate A is input to the cylinder inclination angle control unit 113 in a reproducing operation, the unit 113 is not operated. Therefore, the reproducing operation is performed in the same manner as in the fourth embodiment on condition that the reproduced control signal Scr indicates the standard data rate.

In contrast, in cases where the reproduced control signal Scr indicating the second data rate A/N is input to the cylinder inclination angle control unit 113 in the reproducing operation, a cylinder inclination angle of the rotational cylinder 84 is controlled by the unit 113 to equalize a track reading angle of the rotational heads 85a and 85b with the track inclination angle θ of the tracks. Therefore, each of the first or second azimuth tracks is traced N times by the first or second rotational head 85a or 85b. Each of the blocks of digital recording signals is read out from the first or second azimuth track in one of N tracing operations.

A reading operation in which the blocks of digital recording signals recorded on the magnetic tape T in case of the second data rate A/2 are read from the magnetic tape T driven at half the first traveling speed is described in detail with reference to FIG. 27.

Figure 27:
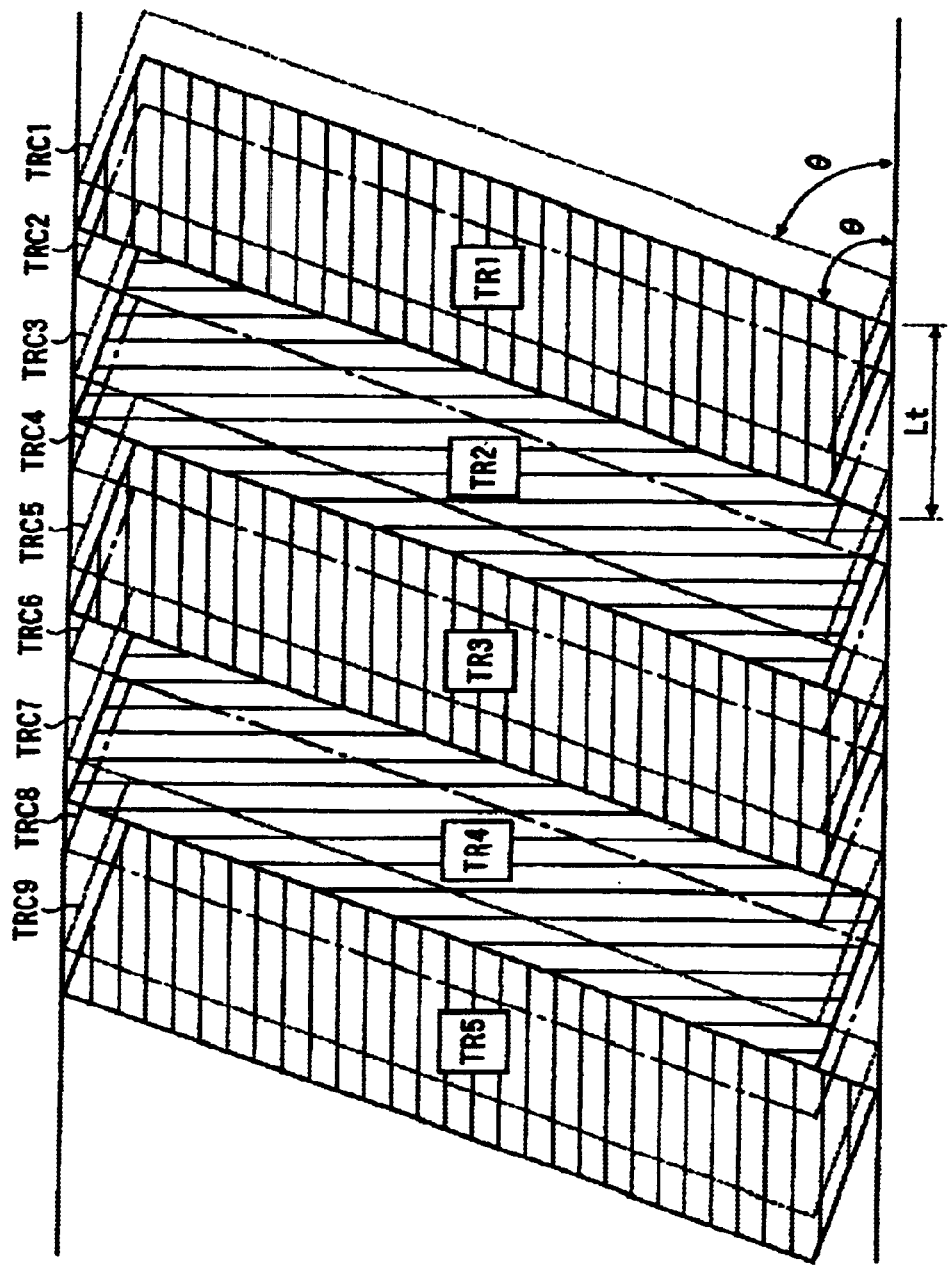
FIG. 27 shows tracing operations alternately performed by the first and second rotational heads for the tracks shown in FIG. 24 according to the fifth embodiment to equalize a tracing angle with a track inclination angle.

As shown in FIG. 27, in cases where the reproduced control signal Scr indicating half the standard data rate is input to the tape traveling speed control unit 100, the magnetic tape T is driven at half the first traveling speed, and the rotational cylinder 84 is rotated at the first rotational speed. Therefore, the first rotational head 85a traces a series of first tracing areas of the magnetic tape T in a series of tracing operations TRCi (i is odd numbers) one after another at a track reading angle equalized with the track inclination angle θ. Each of the first tracing areas is indicated by a rectangle drawn by a broken line. Also, the second rotational head 85b traces a series of second tracing areas of the magnetic tape T in a series of tracing operations TRCj (j is even numbers) one after another at the track reading angle. Each of the second tracing areas is indicated by a rectangle drawn by a dot-dash line. In this case, a tracking phase of each rotational head is shifted by an angle of 45 degrees at a reading start point of each track in the same manner as in the fourth embodiment.

Therefore, as shown in Table 1, each of the blocks of digital recording signals recorded on a series of tracks TRk (k is natural numbers) is read through the first or second rotational head 85a or 85b.

reproduced, each of the rotational heads does not cross a plurality of tracks in the reproducing operation. Therefore, though it is required in the fourth embodiment that N pieces of read data obtained in the N tracing operations are synchronized to reproduce one block of digital recording signals read from the one track of the magnetic tape T, this synchronization is not required in the fifth embodiment, and each digital recording signal can be reproduced in the apparatus 111 having a simplified configuration to have a constant amplitude and a superior signal-noise ratio.

In the fifth embodiment, an inclination of the rotational cylinder 84 with respect to the traveling direction of the magnetic tape T is changed by controlling the rotational cylinder 84. However, it is applicable that a traveling direction of the magnetic tape T be changed without controlling the rotational cylinder 84.

Having illustrated and described the principles of the present invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A magnetic recording and reproducing apparatus for recording and reproducing digital signals on and from a

TABLE 1

| | Tracing operation | | | | | | | | |
|---|---|---|---|---|---|---|---|---|---|
| | TRC 1 | TRC 2 | TRC 3 | TRC 4 | TRC 5 | TRC 6 | TRC 7 | TRC 8 | TRC 9 |
| azimuth angle | 1 | 2 | 1 | 2 | 1 | 2 | 1 | 2 | 1 |
| Reproduction of first azimuth track | ○ | X | | | ○ | | X | | ○ |
| Reproduction of second azimuth track | | X | | ○ | | X | | ○ | |
| Reproduced track | TR1 | | | TR2 | TR3 | | | TR4 | TR5 |

In Table 1, "1" of the azimuth angle denotes the first azimuth angle of the first rotational head 85a relating to the tracing operation TRi, "2" of the azimuth angle denotes the second azimuth angle of the second rotational head 85b relating to the tracing operation TRj, "O" of the first or second azimuth track denotes that one block of digital recording signals recorded on the first or second azimuth track is read through the first or second rotational head in a corresponding tracing operation, "X" of the first or second azimuth track denotes that any block of digital recording signals recorded on the first or second azimuth track is not read in a corresponding tracing operation, and "TRk" of the reproduced track denotes the number of the track from which one block of digital recording signals is read.

Therefore, when an overlapping area between a track and a tracing area is the largest in a tracing operation, one block of digital recording signals recorded on the track is read out in the tracing operation.

Accordingly, because a cylinder inclination angle of the rotational cylinder 84 is controlled by the cylinder inclination angle control unit 113 to equalize a track reading angle of the rotational heads 85a and 85b with the track inclination angle θ of the tracks in cases where the blocks of digital recording signals relating to the input digital information signals Sin transmitted at the second data rate A/N is magnetic recording medium, the apparatus being arranged to record a first digital input signal having a first data rate in a first recording mode, and a second digital input signal having a second data rate in a second recording mode, the second data rate being lower than the first data rate, the apparatus comprising:

signal producing means for producing a plurality of blocks of digital recording signals by processing the first and second digital input signals;

driving means for driving the magnetic recording medium at a first travelling speed in the first recording mode and at a second travelling speed in the second recording mode, wherein the second travelling speed is lower than the first travelling speed;

a rotational drum;

recording and reading means for recording and reading the blocks of digital recording signals on and from the magnetic recording medium driven by the driving means, the recording and reading means including a first azimuth head having a first azimuth angle, and a second azimuth head having a second azimuth angle which is different from the first azimuth angle, the first and second azimuth heads being spaced 180 degrees apart on the rotational drum;

selecting means for selectively supplying the blocks of digital recording signals to the first and second azimuth heads, and signal reproducing means for reproducing the blocks of digital recording signals, where the blocks of digital recording signals recorded on the magnetic recording medium are read by the first and second azimuth heads through the selecting means;

wherein the apparatus further comprises signal producing means for producing tape travelling information; the recording and reading means are arranged to record and read the tape travelling information on and from the magnetic recording medium; the recording and reading means reproduce the blocks of digital recording signals recorded on the magnetic recording medium based on the tape travelling information recorded on the magnetic recording medium; the rotational drum is arranged to revolve at a fixed speed common to the first and second recording modes; the apparatus is arranged to record the first digital input signal in the first recording mode on the magnetic recording medium running at the first travelling speed alternately using the first and second azimuth heads on the rotational drum revolving at the fixed speed by the selecting means arranged to supply blocks of digital recording signal corresponding to the first digital input signal to the first and second azimuth heads without interruption so that tracks of the blocks of digital recording signal are formed on the magnetic recording medium at every tape trace of each of the first and second azimuth heads; and wherein the apparatus is arranged to record the second digital input signal in the second recording mode on the magnetic recording medium running at the second travelling speed alternately using the first and second azimuth heads on the rotational drum revolving at the fixed speed by the selecting means being arranged to supply blocks of digital recording signal corresponding to the second digital input signal intermittently to the first and second azimuth heads so that the tracks of the blocks of digital recording signal are formed on the magnetic recording medium at every Kth trace of the first and second azimuth heads, where K is a number greater than one.

2. An apparatus according to claim 1, wherein K is a number corresponding to a ratio of the first data rate to the second data rate.

3. An apparatus according to claim 1, wherein K is a number corresponding to a ratio of the first travelling speed to the second travelling speed.

4. An apparatus according to claim 1, wherein:

said second data rate is substantially equal to $1/(2N+1)$ times the first data rate, where N is a natural number greater than zero, the second travelling speed is substantially equal to $1/(2N+1)$ times the first travelling speed, and $K=2N+1$, the selecting means being arranged to supply blocks of digital recording signal corresponding to the second digital input signal intermittently to the first and second azimuth heads so that the tracks of the blocks of digital recording signal are formed on the magnetic recording medium at every $(2N+1)$th trace of the first and second azimuth heads.

5. An apparatus according to claim 4, wherein:

the apparatus is further arranged to record a third digital input signal having a third data rate in a third recording mode on and from the magnetic recording medium;

the signal producing means is arranged to produce a plurality of blocks of digital recording signals by processing the third digital input signal;

the driving means is arranged to drive the magnetic recording medium at a third travelling speed in a third recording mode, wherein the third data rate is equal to $1/(2M)$ times the first data rate and the third travelling speed is equal to $1/(2M)$ times the first travelling speed, where M is a natural number greater than zero; the recording and reading means further includes a third azimuth head having the same azimuth angle as the first azimuth angle, the third azimuth head being disposed adjacent to the second azimuth head on the rotational drum; and the apparatus is arranged to record the third digital input signal in the third recording mode on the magnetic recording medium running at the third travelling speed alternately using the second and third azimuth heads on the rotational drum revolving at the fixed speed by the selecting means being arranged to supply blocks of digital recording signal corresponding to the third digital input signal intermittently to the second and third azimuth heads so that the tracks of the blocks of digital recording signal are formed on the magnetic recording medium at every $(2M)$th trace of the second and third azimuth heads.

6. A method of recording and reproducing digital signals on and from a magnetic recording medium, comprising the steps of:

recording a first digital input signal having a first data rate in a first recording mode, and a second digital input signal having a second data rate in a second recording mode, the second data rate being lower than the first data rate;

producing a plurality of blocks of digital recording signals by processing the first and second digital input signals;

driving the magnetic recording medium at a first travelling speed in the first recording mode and at a second travelling speed in the second recording mode, wherein the second travelling speed is lower than the first travelling speed;

recording and reading the blocks of digital recording signals on and from the magnetic recording medium using a first azimuth head having a first azimuth angle, and a second azimuth head having a second azimuth angle which is different from the first azimuth angle, the first and second azimuth heads being spaced 180 degrees apart on a rotational drum;

selectively supplying the blocks of digital recording signals to the first and second azimuth heads;

reproducing the blocks of digital recording signals, where the blocks of digital recording signals recorded on the magnetic recording medium are read by the first and second azimuth heads;

producing tape travelling information, recording and reading the tape travelling information on and from the magnetic recording medium, and reproducing the blocks of digital recording signals recorded on the magnetic recording medium based on the tape travelling information recorded on the magnetic recording medium;

revolving the rotational drum at a fixed speed common to the first and second recording modes;

recording the first digital input signal in the first recording mode on the magnetic recording medium running at the first travelling speed alternately using the first and second azimuth heads on the rotational drum revolving at the fixed speed by selectively supplying blocks of digital recording signal corresponding to the first digital input signal to the first and second azimuth heads without interruption so that tracks of the blocks of digital recording signal are formed on the magnetic recording medium at every tape trace of each of the first and second azimuth heads; and recording the second digital input signal in the second recording mode on the magnetic recording medium running at the second travelling speed alternately using the first and second azimuth heads on the rotational drum revolving at the fixed speed by selectively supplying blocks of digital recording signal corresponding to the second digital input signal intermittently to the first and second azimuth heads so that the tracks of the blocks of digital recording signal on the magnetic recording medium are formed at every Kth trace of the first and second azimuth heads, where K is a number greater than one.

7. A method according to claim 6, wherein K is a number corresponding to a ratio of the first data rate to the second data rate.

8. A method according to claim 6, wherein K is a number corresponding to a ratio of the first travelling speed to the second travelling speed.

9. A method according to claim 6, wherein said second data rate is substantially equal to $1/(2N+1)$ times the first data rate, where N is a natural number greater than zero, the second travelling speed is substantially equal to $1/(2N+1)$ times the first travelling speed, and $K=2N+1$, wherein said step of recording the second digital input signal comprises selectively supplying said blocks of digital recording signal corresponding to the second digital input signal intermittently to the first and second azimuth heads so that the tracks of the blocks of digital recording signal on the magnetic recording medium are formed at every $(2N+1)$th trace of the first and second azimuth heads.

10. A method according to claim 9, further comprising the steps of:

recording and reproducing a third digital input signal having a third data rate in a third recording mode on and from the magnetic recording medium, wherein the third data rate is equal to $1/(2M)$ times the first data rate, where M is a natural number greater than zero;

producing a plurality of blocks of digital recording signals by processing the third digital input signal;

driving the magnetic recording medium at a third travelling speed in a third recording mode, wherein the third travelling speed is equal to $1/(2M)$ times the first travelling speed, wherein the recording and reading step further includes using a third azimuth head having the same azimuth angle as the first azimuth angle and disposed adjacent to the second azimuth head on the rotational drum; and recording the third digital input signal in the third recording mode on the magnetic recording medium running at the third travelling speed, using alternately the second and third azimuth heads on the rotational drum revolving at the fixed speed by selectively supplying blocks of digital recording signal corresponding to the third digital input signal intermittently to the second and third azimuth heads so that each of the tracks of the blocks of digital recording signal are formed on the magnetic recording medium at every $(2M)$th trace of the second and third azimuth heads.

* * * * *